US008163074B2

(12) United States Patent
Banning

(10) Patent No.: US 8,163,074 B2
(45) Date of Patent: *Apr. 24, 2012

(54) PHASE CHANGE INKS CONTAINING COLORANT COMPOUNDS

(75) Inventor: Jeffrey H. Banning, Hillsboro, OR (US)

(73) Assignee: Xerox Corporation, Norwalk, CT (US)

(*) Notice: Subject to any disclaimer, the term of this patent is extended or adjusted under 35 U.S.C. 154(b) by 803 days.

This patent is subject to a terminal disclaimer.

(21) Appl. No.: 11/702,932

(22) Filed: Feb. 6, 2007

(65) Prior Publication Data
US 2008/0186372 A1 Aug. 7, 2008

(51) Int. Cl.
C09D 11/00 (2006.01)
G01D 11/00 (2006.01)

(52) U.S. Cl. ............... 106/31.29; 106/31.43; 347/99

(58) Field of Classification Search .................. None
See application file for complete search history.

(56) References Cited

U.S. PATENT DOCUMENTS

| 1,981,515 | A | 11/1934 | Kyrides | 562/58 |
| 1,981,516 | A | 11/1934 | Kyrides | 562/58 |
| 1,991,482 | A | 2/1935 | Allemann | 8/658 |
| 3,653,932 | A | 4/1972 | Berry et al. | 106/31.29 |
| 4,318,859 | A | 3/1982 | Hermann | 552/109 |
| 4,390,369 | A | 6/1983 | Merritt et al. | 106/31.1 |
| 4,484,948 | A | 11/1984 | Merritt et al. | 106/31.3 |
| 4,647,675 | A | 3/1987 | Mayer et al. | 549/394 |
| 4,684,956 | A | 8/1987 | Ball | 347/88 |
| 4,830,671 | A | 5/1989 | Frihart et al. | 106/31.28 |
| 4,851,045 | A | 7/1989 | Taniguchi | 106/31.31 |
| 4,889,560 | A | 12/1989 | Jaeger et al. | 106/31.29 |
| 4,889,761 | A | 12/1989 | Titterington et al. | 428/32.1 |
| 4,935,059 | A | 6/1990 | Mayer et al. | 106/31.43 |
| 5,006,170 | A | 4/1991 | Schwarz et al. | 106/31.3 |
| 5,013,857 | A | 5/1991 | Berneth et al. | 552/110 |
| 5,084,099 | A | 1/1992 | Jaeger et al. | 106/31.29 |
| 5,151,120 | A | 9/1992 | You et al. | 106/31.29 |
| 5,194,638 | A | 3/1993 | Frihart et al. | 554/47 |
| 5,195,430 | A | 3/1993 | Rise | 100/168 |
| 5,221,335 | A | 6/1993 | Williams et al. | 524/560 |
| 5,372,852 | A | 12/1994 | Titterington et al. | 427/288 |
| 5,389,958 | A | 2/1995 | Bui et al. | 347/103 |
| 5,496,879 | A | 3/1996 | Griebel et al. | 524/320 |
| 5,507,864 | A | 4/1996 | Jaeger et al. | 106/31.32 |
| 5,597,856 | A | 1/1997 | Yu et al. | 524/227 |
| 5,621,022 | A | 4/1997 | Jaeger et al. | 523/161 |
| 5,747,554 | A | 5/1998 | Sacripante et al. | 523/161 |
| 5,750,604 | A | 5/1998 | Banning et al. | 524/187 |
| 5,780,528 | A | 7/1998 | Titterington et al. | 523/161 |
| 5,782,966 | A | 7/1998 | Bui et al. | 106/31.43 |
| 5,783,658 | A | 7/1998 | Banning et al. | 101/491 |
| 5,827,918 | A | 10/1998 | Titterington et al. | 524/590 |
| 5,830,942 | A | 11/1998 | King et al. | 524/590 |
| 5,847,161 | A | 12/1998 | Bronstein et al. | 549/220 |
| 5,902,841 | A | 5/1999 | Jaeger et al. | 523/161 |
| 5,919,839 | A | 7/1999 | Titterington et al. | 523/161 |
| 6,174,937 | B1 | 1/2001 | Banning et al. | 523/160 |
| 6,255,432 | B1 | 7/2001 | Evans et al. | 528/49 |
| 6,309,453 | B1 | 10/2001 | Banning et al. | 106/31.29 |
| 6,860,931 | B2 | 3/2005 | Wu et al. | 106/31.29 |
| 7,485,728 | B2 | 2/2009 | Banning | |
| 7,485,737 | B2* | 2/2009 | Banning | 552/208 |
| 7,736,426 | B2 | 6/2010 | Banning | |
| 2004/0261657 | A1* | 12/2004 | Wu et al. | 106/31.29 |
| 2009/0099372 | A1* | 4/2009 | Banning | 549/394 |

FOREIGN PATENT DOCUMENTS

| DE | 1232098 | 5/1971 |
| EP | 0 012 283 | 6/1980 |
| EP | 0 329 026 | 8/1989 |
| EP | 1 493 781 | 1/2005 |
| JP | 62-278571 | * 12/1987 |
| WO | 421737 | 12/1934 |
| WO | 0187352 | 7/1986 |
| WO | 0206286 | 12/1986 |
| WO | 2238792 | 6/1991 |
| WO | WO 94/04619 | 3/1994 |
| WO | WO 94/14902 | 7/1994 |
| WO | WO 95/04760 | 2/1995 |
| WO | 2294939 | 5/1996 |
| WO | 2305928 | 4/1997 |
| WO | 2311075 | 9/1997 |
| WO | WO 97/33943 | 9/1997 |
| WO | WO 2005/052069 | 7/2006 |

OTHER PUBLICATIONS

U.S. Appl. No. 10/607,382, filed Jun. 26, 2003, of Jeffrey H. Banning et al., entitled "Colorant Compounds", published Jan. 20, 2005.
English Abstract for German Patent Publication DE 4205636AL, Aug. 1993.
English Abstract for German Patent Publication DE 4205713AL, Mar. 1996.
English abstract for Japanese Patent Publication JP 61221265, Oct. 1986.
Rhodamine Dyes and Related Compounds, "IV. Aryl- and Benzylrhodamines," I. S. Ioffe et al., translated from Zhurnal Obschei Khimii, vol. 32, No. 4, (May 1962), pp. 1480-1485.

(Continued)

Primary Examiner — Melvin Mayes
Assistant Examiner — Yun Qian
(74) Attorney, Agent, or Firm — Marylou J. Lavoie

(57) ABSTRACT

Phase change inks comprising a carrier and a colorant of the formula

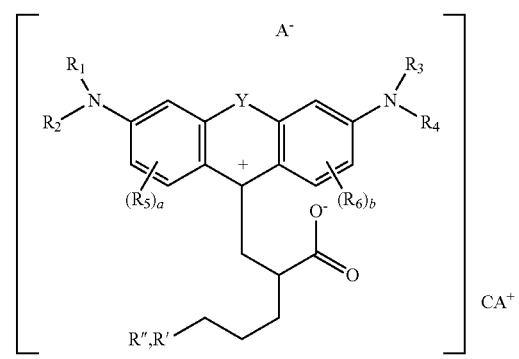

wherein $R_1$, $R_2$, $R_3$, $R_4$, $R_5$, $R_6$, R', R'', Y, $CA^+$, and $A^-$ each, independently of the others are as defined herein.

24 Claims, No Drawings

OTHER PUBLICATIONS

Rhodamine Dyes and Related Compounds, "XV. Rhodamine Dyestuffs with Hydroaromatic and Polymethylene Radicals," I. S. Ioffe et al., translated from Zhurmal Obschei Khimii, vol. 1, No. 3, (Mar. 1965), pp. 584-586.

Rhodamine Dyes and Related Compounds, "XVI. Butylrhodamines," I. S. Ioffe et al., translated from Zhumal Obschei Khimii, vol. 1, No. 12, (Dec. 1965), pp. 2172-2176.

Rhodamine Dyes and Related Compounds, "XXI. Mutual Conversions of the Colorless and Colored Forms of N,N'-Substituted Rhodamines," I. S. Ioffe et al., translated from Zhumal Obschei Khimii, vol. 1, No. 12, (1972), pp. 1765-1767.

"Tautomerism of Rhodamines," Mchedlov-Petrosyan et al., translated from Zhurnal Obshchei Khimii, vol. 61, No. 1, pp. 225-2333, Jan. 1991., et al.; USSR. Vestn. Khark'k. Univ. (1989), 340 pp. 3-4, CODEN: VKSGA3 ISSN: 0453-8048. Journal; General Review written in Russian. "Ionization and Tautomerization of Xanthene Dyes in Mixtures of Water with Dimethyl Sulfoxide," Mchedlov-Petrosyan et al., translated from Zhurnal Obshchei Khimii, vol. 61, No. 1, pp. 225-2333, Jan. 1991.

"Structural Conversions of Rhodamines in Solution," Mchedlov-Petrosyan et al., translated from Izvestiya Akademii Nauk, Seriya Khimicheskaya, No. 3, pp. 512-521, Mar. 1992.

"Efficient Synthesis of Rhodamine Cnjugates through the 2'-position," Grote et al., Biorganic & Medicinal Chemistry Letters 10 (2000), pp. 1539-1541.

"Characterization of the Chromophore Orientation of Rhodaine B Amphiphiles in Langmuir-Blodgett Monolayers," Ishibashi et al., J. Colloid Interface Sci. (2001), Abstract Only.

European Search Report, European Patent Application No. 08 150 770.9, dated May 7, 2008, 4 pages.

Office Action Mailed Aug. 5, 2010, for co-pending U.S. Appl. No. 12/336,569, filed Dec. 17, 2008, entitled "Colorant Compounds," of Jeffrey H. Banning.

* cited by examiner

PHASE CHANGE INKS CONTAINING COLORANT COMPOUNDS

Cross-reference is made to the following applications: Application U.S. Ser. No. 11/702,757 now U.S. Pat. No. 7,485,737, filed concurrently herewith, entitled "Colorant Compounds," with the named inventor Jeffery H. Banning, the disclosure of which is totally incorporated herein by reference, discloses a colorant compound.

Application U.S. Ser. No. 11/702,758, now U.S. Pat. No. 7,485,728 filed concurrently herewith, entitled "Colorant Compounds" with the named inventor Jeffrey H. Banning, the disclosure of which is totally incorporated herein by reference, and Application U.S. Ser. No. 11/702,875, now U.S. Pat. No. 7,736,426, filed concurrently herewith, entitled "Phase Change Inks Containing Colorant Compounds," with the named inventor Jeffery H. Banning, the disclosure of which is totally incorporated herein by reference, disclose a phase change ink composition comprising a phase change ink carrier and a colorant compound of the formula

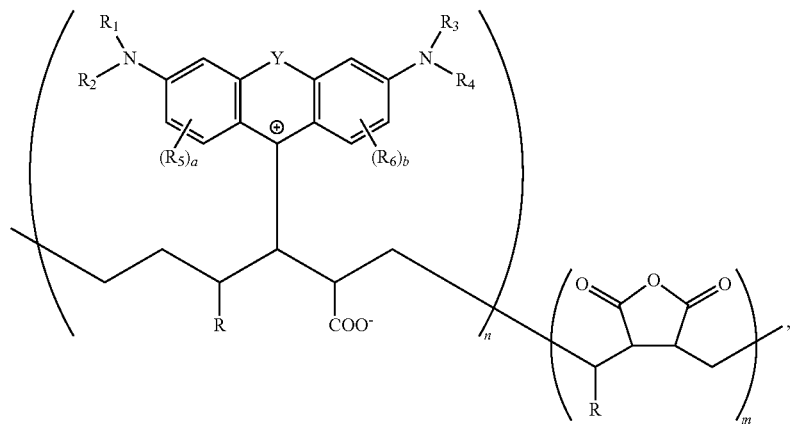

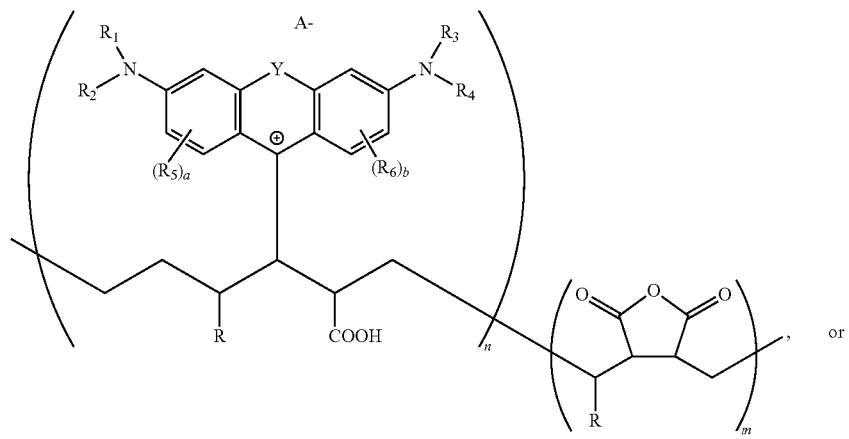

or

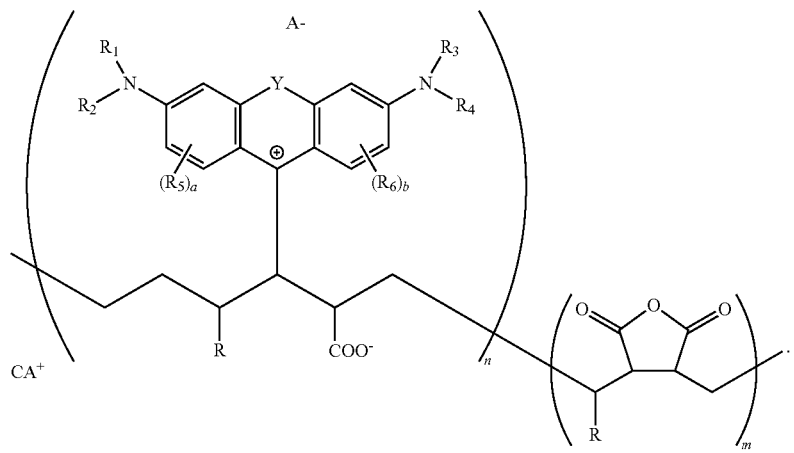

BACKGROUND

The present disclosure is generally related to phase change inks. More specifically, the present disclosure is directed to hot melt or phase change inks containing specific colorant compounds. One embodiment of the present disclosure is directed to a phase change ink carrier and a compound of the formula

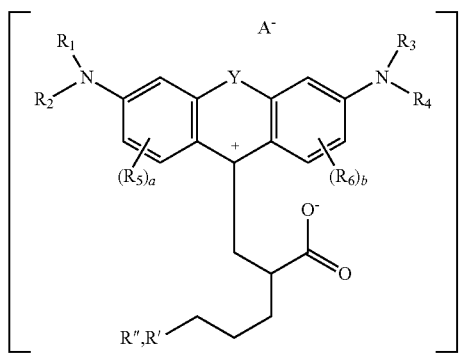 CA$^+$,

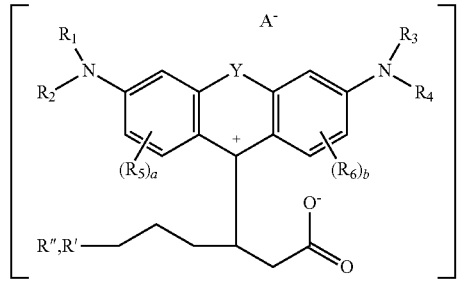 CA$^+$,

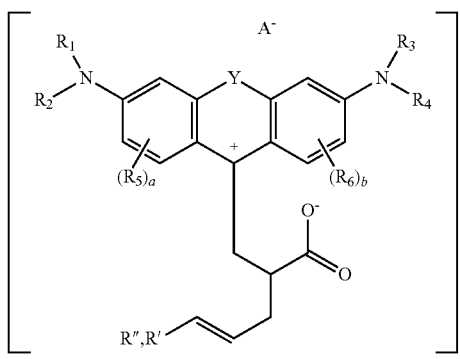 CA$^+$,

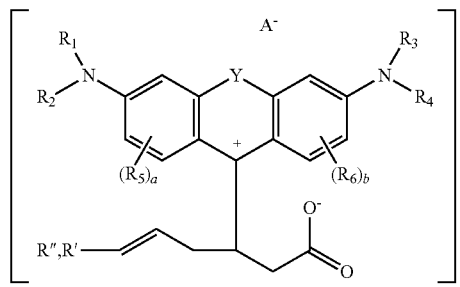 CA$^+$,

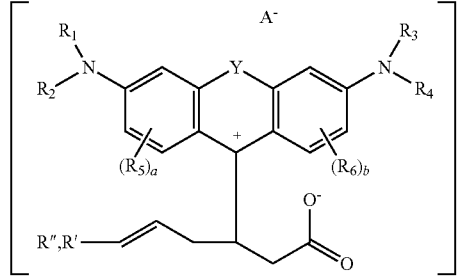 CA$^+$,

-continued

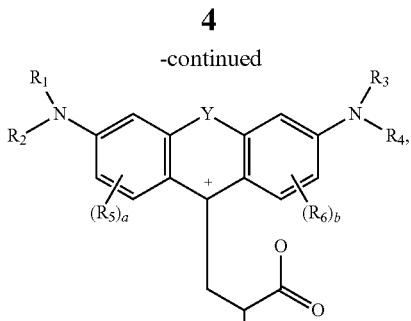

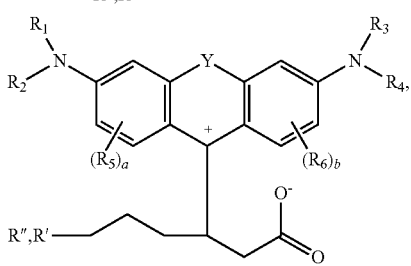

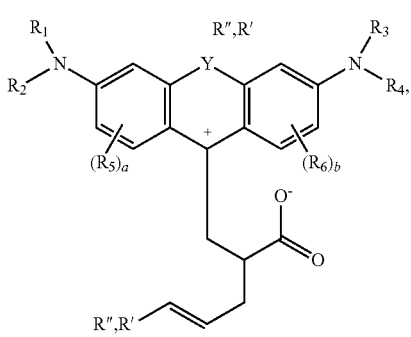

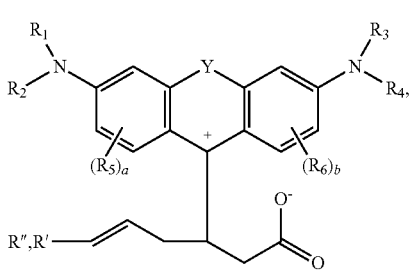

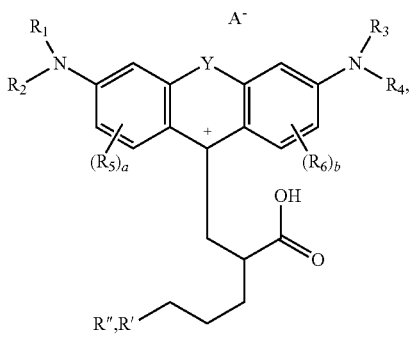

-continued

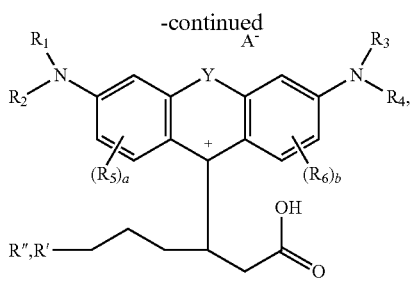

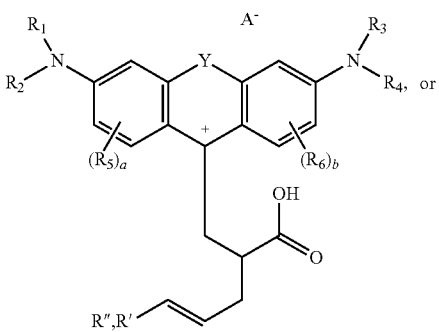

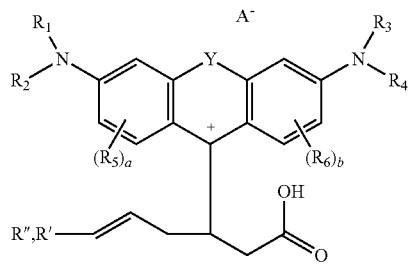

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3; wherein $R_5$ and $R_6$ are each optionally present and wherein each of $R_5$ and $R_6$ independently of the other, if present, are independently selected from (i) an alkyl group, (ii) an, aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi), a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$ and $R_6$ can each be joined to a phenyl ring in the central structure, wherein

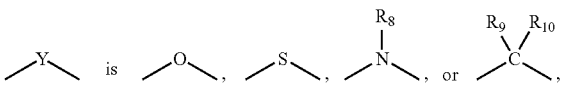

wherein $R_8$, $R_9$, and $R_{10}$ each, independently of the other, is optionally present and wherein, if one or more are present, each of $R_8$, $R_9$, and $R_{10}$ is independently selected from (i) a hydrogen atom, (ii) an alkyl group, (iii) an aryl group, (iv) an arylalkyl group, or (v) an alkylaryl group; wherein in further embodiments, the number of carbon atoms in $R_1+R_2+R_3+R_4+R_5+R_6+R_8+R_9+R_{10}$ is at least about 4, or in another embodiment at least about 16; wherein R" is optionally present and wherein R' and R", if present, are each independently selected from (i) an alkyl group, (ii) an aryl group, (iii) an arylalkyl group, or (iv) an alkylaryl group, wherein R' or R" are independently selected from linear or branched, saturated or unsaturated, or cyclic components, wherein in embodiments, R' or R", if present, are independently selected from an alkyl group containing from about 0 carbon atoms (that is, R" is 0) to about 8 carbon atoms, from about 1 carbon atom to about 8 carbon atoms, or about 12 carbon atoms, or about 18 carbon atoms, or about 30 carbon atoms, or about 50 carbon atoms, or about 100 carbon atoms, wherein in embodiments, R' or R", if present, are independently selected from an aryl group containing about 5 carbon atoms, or about 6 carbon atoms, or about 10 carbon atoms, wherein in embodiments R' or R", if present, are independently an alkylaryl group or an arylalkyl group containing about 7 carbon atoms, or about 30 carbon atoms, or about 50 carbon atoms; or about 100 carbon atoms, wherein in one embodiment, R' contains about 18 carbon atoms and R" is 0 carbon atoms; wherein A is an anion, and wherein CA is either a hydrogen atom or a cation.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling. Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

British Patent Publication GB 2 311 075 (Gregory et al.), the disclosure of which is totally incorporated herein by reference, discloses a compound of the formula

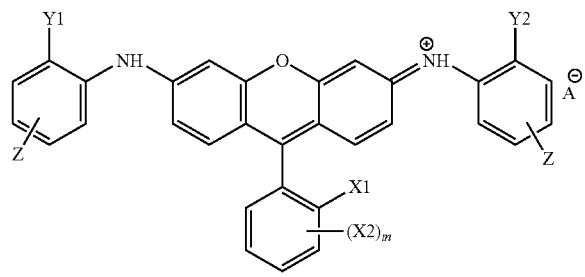

wherein X1 is an ester group or an amide group (such as of a carboxylic or sulfonic acid) or a fatty amine salt of a sulfonic acid, each X2 independently is a substituent, m has a value of from 0 to 2, Y1 and Y2 are each independently H, alkyl, or halo, each Z independently is an ester or amide group, and A- is an anion. The compound is useful as a colorant for toners, D2T2 printing, plastics, polyesters, nylons, and inks, especially ink jet or hot melt inks.

U.S. Pat. No. 1,991,482 (Allemann), the disclosure of which is totally incorporated herein by reference, discloses a process of producing rhodamine dyes which comprises condensing a halogenated primary amine of the benzene series with fluorescein dichloride and sulfonating the condensed product. U.S. Pat. No. 5,013,857 (Berneth et al.), the disclosure of which is totally incorporated herein by reference, discloses a process for the preparation of sulpho-free triphenyl-methane dyestuffs. U.S. Pat. No. 5,847,162 (Lee et al.), the disclosure of which is totally incorporated herein by reference, discloses a class of 4,7-dichlororhodamine compounds useful as fluorescent dyes having the structure

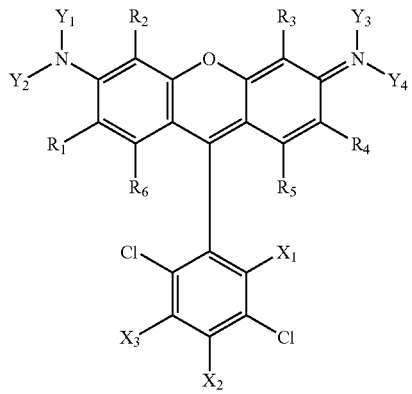

wherein $R_1$-$R_6$ are hydrogen, fluorine, chlorine, lower alkyl lower alkene, lower alkyne, sulfonate, sulfone, amino, amido, nitrile, lower alkoxy, lining group, or combinations thereof or, when taken together, $R_1$ and $R_6$ is benzo, or, when taken together, $R_4$ and $R_5$ is benzo; $Y_1$-$Y_4$ are hydrogen or lower alkyl or, when taken together, $Y_1$ and $R_2$ is propano and $Y_2$ and $R_1$ is propano, or, when taken together, $Y_3$ and $R_3$ is propano and $Y_4$ and $R_4$ is propano; and $X_1$-$X_3$ taken separately are selected from the group consisting of hydrogen, chlorine, fluorine, lower alkyl carboxylate, sulfonic acid, —$CH_2OH$, and linking group. In another aspect, the disclosure includes reagents labeled with the 4,7-dichlororhodamine dye compounds, including deoxynucleotides, dideoxynucleotides, and polynucleotides. In an additional aspect, the disclosure includes methods utilizing such dye compounds and reagents including dideoxy polynucleotide sequencing and fragment analysis methods. U.S. Pat. No. 4,935,059 (Mayer et al.), the disclosure of which is totally incorporated herein by reference, discloses basic rhodamine dyes suitable for use in recording fluids for the ink jet process and for coloring paper stock having the formula

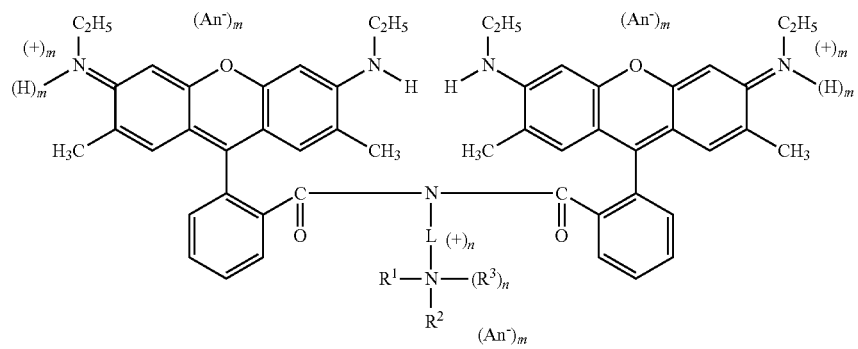

where L is $C_2$-$C_{10}$-alkylene, $R_1$, $R_2$, and $R_3$ are each independently of the others hydrogen, substituted or unsubstituted $C_1$-$C_{10}$-alkyl or $C_5$-$C_7$-cycloalkyl or $R_1$ and $R_2$ together with the nitrogen atom linking them together are a heterocyclic radical, An- is one equivalent of an anion and m and n are each independently of the other 0 or 1. U.S. Pat. No. 4,647,675 (Mayer et. al.), the disclosure of which is totally incorporated herein by reference, discloses compounds of the general formula

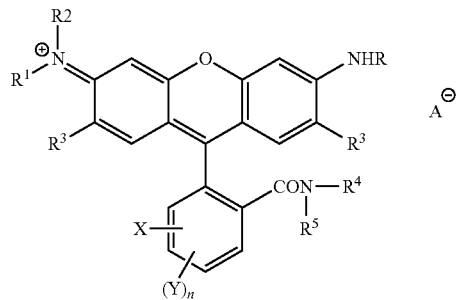

where A- is an anion, R is hydrogen or unsubstituted or substituted alkyl or cycloalkyl, $R_1$ and $R_2$ independently of one another are each hydrogen or unsubstituted or substituted alkyl or cycloalkyl, or one of the radicals may furthermore be aryl, or $R_1$ and $R_2$, together with the nitrogen atom, form a saturated heterocyclic structure, the radicals $R_3$ independently of one another are each hydrogen or $C_1$-$C_4$-alkyl, $R_4$ and $R_5$ independently of one another are each unsubstituted or substituted alkyl or cycloalkyl, or one of the radicals may furthermore be hydrogen, aryl or hetaryl, $R_4$ and $R_5$, together with the nitrogen atom, form a saturated heterocyclic structure, n is 1, 2 or 3, X is hydrogen, chlorine, bromine, $C_1$-$C_4$ alkyl, $C_1$-$C_4$-alkoxy or nitro and Y is hydrogen or chlorine, are particularly useful for dyeing paper stocks. U.S. Pat. No. 1,981,515 (Kyrides), the disclosure of which is totally incorporated herein by reference, discloses intermediates for rhodamine dyestuffs. U.S. Pat. No. 1,981,516 (Kyrides), the disclosure of which is totally incorporated herein by reference, discloses intermediates for secondary alkylated rhodamine dyes. British Patent Publication GB 421 737, the disclosure of which is totally incorporated herein by reference, discloses dyes of the rhodamine series, which are prepared by condensing naphthalene-2:3-dicarboxylic acid with a m-aminophenol in which the nitrogen group is substituted by one or two alkyl groups, the products, if desired, being sulphonated. The unsulphonated products may be used as lake colouring matters whilst the sulphonated dyes are acid wool dyes. In examples, (1) naphthalene-2:3-dicarboxylic acid is condensed with diethyl-m-aminophenol in the presence of zinc chloride giving a product which dyes tannin-mordanted cotton in the same shade as Rhodamine B and a sulphonated product which dyes wool bluish-red shades; (2) monoethyl-m-aminophenol is used instead of the diethyl-m-aminophenol in example (1), yielding a dye, which when sulphonated dyes wool red-orange shades; (3) 2-ethylamino-p-cresol replaces the diethyl-m-aminophenol in example (1), yielding a dye dyeing and printing tannin-mordanted cotton in shades similar to Rhodamine 69BS and when sulphonated dyeing wool red. Japanese Patent Publication JP 61221265, the disclosure of which is totally incorporated herein by reference, discloses rhodamine compounds of formula I

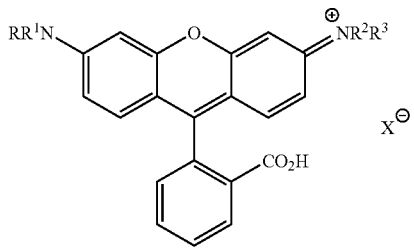

wherein $R_1$, $R_3$ are each lower alkyl; $R_2$ is lower alkyl, 10 C or higher long-chain alkyl; $R_4$ is 10 C or higher long-chain alkyl; X— is an anion, or squarylium compounds of formula II

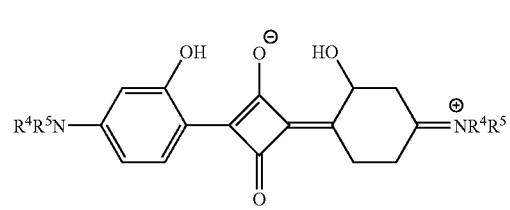

wherein $R_2$ is 10 C or higher long-chain alkyl. Example: 3,6-(N,N'diethyl-N,N'-dioctadecyl)diamino-9-(2-carboxyphenyl)xanthilium perchlorate Use: materials for molecular electronics, which are suitable for use as materials for photoelectric converter, optical memory, etc. Preparation: 2-(4-N,N'-diethylamino-2-hydroxybenzoyl)-benzoic acid, which is a condensate between N-ethyl-N-octadecyl-m-hydroxyaniline and phthalic anhydride, is reacted with N-ethyl-N-octadecyl-m-hydroxyaniline to obtain the compound of formula I. 3-$HOC_6H_4N(Et)(CH_2)_{17}Me$ and phthalic anhydride were heated at 150° for 4 hours, treated with aqueous $NH_3$, and the amorphous intermediate mixed with aqueous $HClO_4$ forming a compound of formula I (R=$R_2$=Et; $R_1$=$R_3$=$C_{18}H_{37}$; X=$ClO_4$), having λmax (MeOH) 550 nm. U.S. Pat. No. 5,084,099 (Jaeger et al.), the disclosure of which is totally incorporated herein by reference, discloses modified phase change ink compatible colorants which comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thin films of uniform thickness of the subject phase change ink compositions which employ the modified phase change ink colorants exhibit a high degree of lightness and chroma. The primary amine-dye chromophore complexes are soluble in the phase change ink carrier and exhibit excellent thermal stability. U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the disclosure, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks. U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition. U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

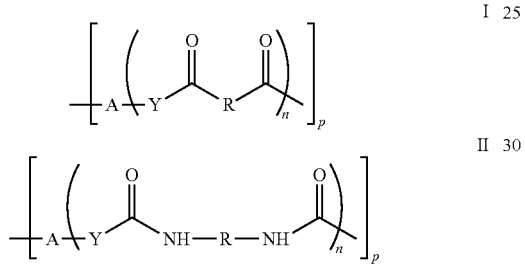

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6. U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound. European Patent Publication 0565798 (Shustack), the disclosure of which is totally incorporated herein by reference, discloses ultraviolet radiation-curable primary and secondary coating compositions for optical fibers. The primary coatings comprise a hydrocarbon polyol-based reactively terminated aliphatic urethane oligomer, a hydrocarbon monomer terminated with at least one end group capable of reacting with the terminus of the oligomer; and an optional photoinitiator. The secondary coatings comprise a polyester and/or polyether-based aliphatic urethane reactively terminated oligomer; a hydrocarbonaceous viscosity-adjusting component capable of reacting with the reactive terminus of (I); and an optional photoinitiator. Also disclosed are optical fibers coated with the secondary coating alone or with the primary and secondary coatings of the disclosure. U.S. patent application Ser. No. 10/607,382, filed Jun. 26, 2003, published Jan. 20, 2005, of Jeffrey H. Banning et al., and U.S. Pat. No. 6,860,931 of Jeffrey H. Banning et al., the disclosures of each of which are totally incorporated by reference herein, disclose in embodiments compounds of the formulae

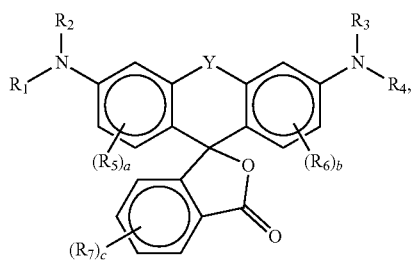

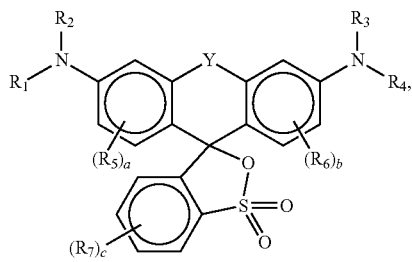

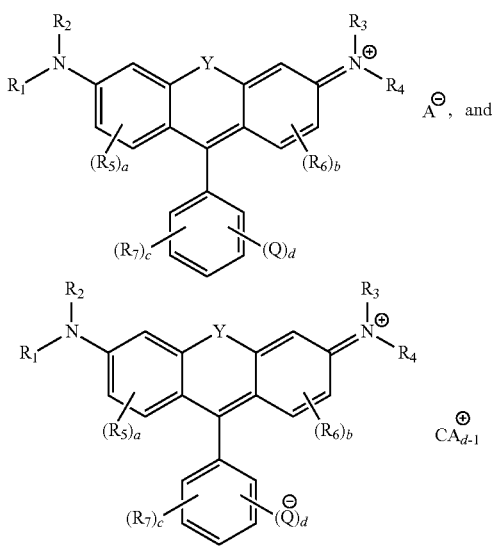

wherein R1, R2, R3, and R4 each, independently of the others, is (i) a hydrogen atom, (ii) an alkyl group, (iii) an aryl group, (iv) an arylalkyl group, or (v) an alkylaryl group, wherein R1 and R2 can be joined together to form a ring, wherein R3 and R4 can be joined together to form a ring, and wherein R1, R2, R3, and R4 can each be joined to a phenyl ring in the central structure, a and b each, independently of the others, is an integer which is 0, 1, 2, or 3, c is an integer which is 0, 1, 2, 3, or 4, each R5, R6, and R7, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx)

an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein R5, R6, and R7 can each be jointed to a phenyl ring in the central structure.

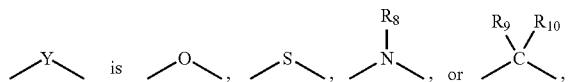

R8, R9, and R10 each, independently of the others, is (i) a hydrogen atom, (ii) an alkyl group, (iii) an aryl group, (iv) an arylalkyl group, or (v) an alkylaryl group, provided that the number of carbon atoms in R1+R2+R3+R4+R5+R6+R7+R8+R9+R10 is at least about 16, each Q, independently of the others, is a COOH group or a SO3H group, each Q-, independently of the others, is a COO— group or a SO3- group, d is an integer which is 1, 2, 3, 4, or 5, A is an anion, and CA is either a hydrogen atom or a cation associated with all but one of the Q- groups, provided that when

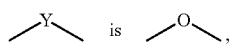

at least one of the following of (a), (b), and (c) is true: (a) the number of carbon atoms in R1+R2+R3+R4 is at least about 42, (b) at least one of R1, R2, R3, and R4 is a group of the formula

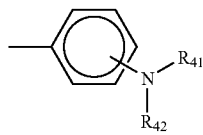

wherein R41 and R42 each, independently of the other, is an alkyl group, an aryl group, an arylalkyl group, or an alkylaryl group, or (c) at least one of R1, R2, R3, and R4 is a branched alkyl group having at least about 19 carbon atoms.

While known compositions and processes are suitable for their intended purposes, a need remains for new magenta colorant compositions. In addition, a need remains for magenta colorant compositions particularly suitable for use in phase change inks. Further, a need remains for magenta colorants with desirable thermal stability. Additionally, a need remains for magenta colorants that exhibit minimal undesirable discoloration when exposed to elevated temperatures. There is also a need for magenta colorants that exhibit a desirable brilliance. In addition, there is a need for magenta colorants that exhibit a desirable hue. Further, there is a need for magenta colorants that are of desirable chroma. Additionally, there is a need for magenta colorants that have desirably high lightfastness characteristics. A need also remains for magenta colorants that have a desirably pleasing color. In addition, a need remains for magenta colorants that exhibit desirable solubility characteristics in phase change ink carrier compositions. Further, a need remains for magenta colorants that enable phase change inks to be jetted at temperatures of over 135° C. while maintaining thermal stability. Further, a need remains for magenta colorants for use in solid ink printers that operate with lower print head temperatures much lower than 135° C. as well as in ultraviolet radiation curable systems. Additionally, a need remains for magenta colorants that enable phase change inks that generate images with low pile height. There is also a need for magenta colorants that enable phase change inks that generate images that approach lithographic thin image quality. In addition, there is a need for magenta colorants that exhibit oxidative stability. Further, there is a need for magenta colorants that do not precipitate from phase change ink carriers. Additionally, there is a need for magenta colorants that do not, when included in phase change inks, diffuse into adjacently printed inks of different colors. A need also remains for magenta colorants that do not leach from media such as phase change ink carriers into tap adhesives, paper, or the like. In addition, a need remains for magenta colorants that, when incorporated into phase change inks, do not lead to clogging of a phase change ink jet printhead. Further, there is a need for magenta colorants that enable phase change inks that generate images with sharp edges that remain sharp over time. Additionally, there is a need for magenta colorants that enable phase change inks that generate images which retain their high image quality in warm climates. Further, there is a need for magenta colorants that enable phase change inks that generate images of desirably high optical density. Additionally, there is a need for magenta colorants that, because of their good solubility in phase change ink carriers, enable the generation of images of low pile height without the loss of desirably high optical density. A need also remains for magenta colorants that enable cost-effective inks. The appropriate components and process aspects of the each of the foregoing may be selected for the present disclosure in embodiments thereof.

SUMMARY

The present disclosure is directed to a phase change ink composition comprising a phase change ink carrier and a compound of the formula

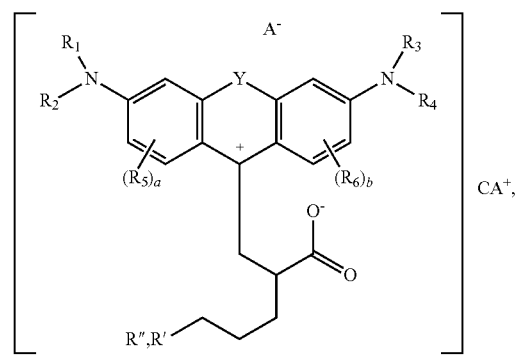

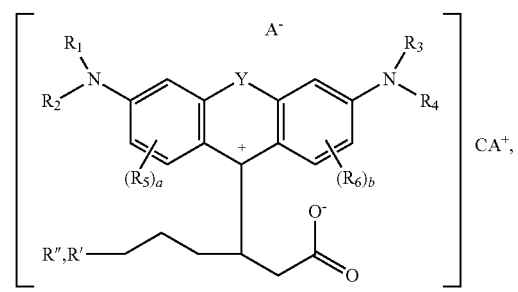

-continued

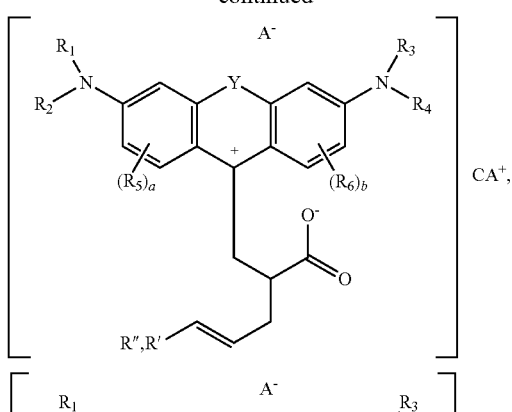

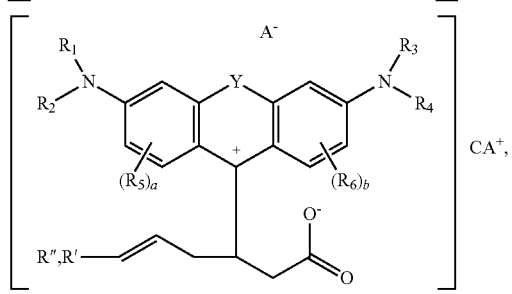

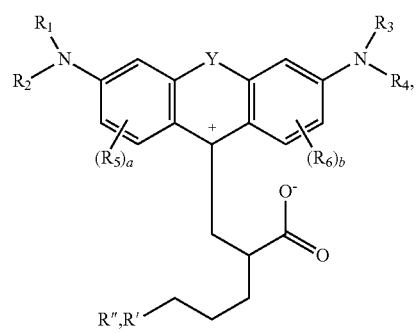

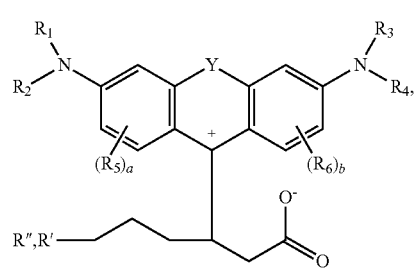

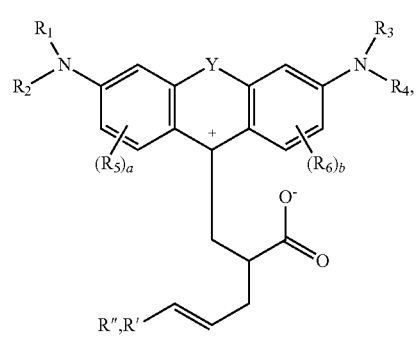

-continued

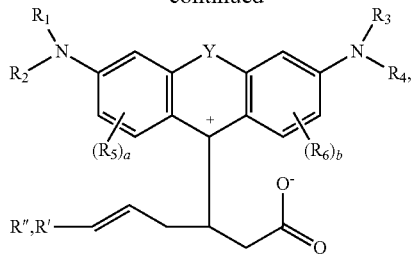

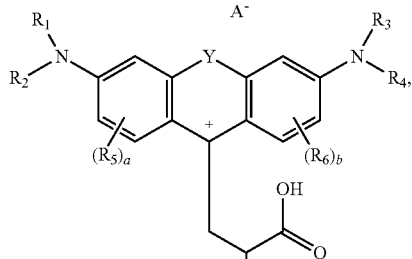

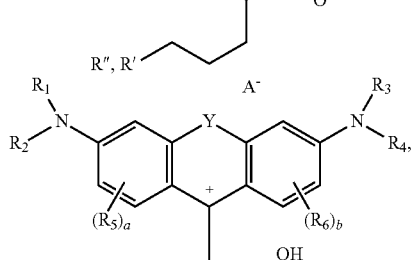

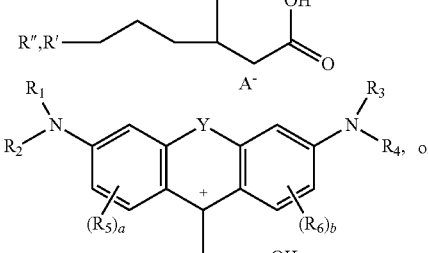

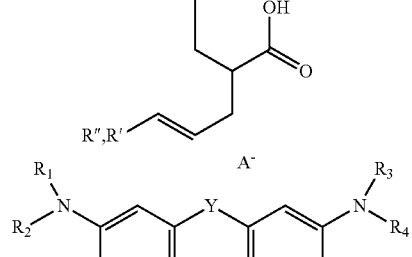

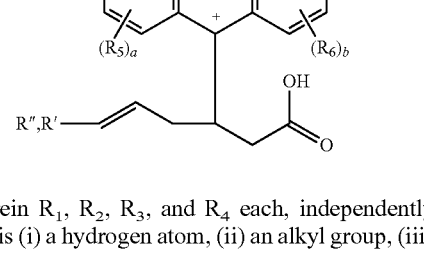

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3; wherein $R_1$ and $R_6$ are each optionally present and wherein each of $R_5$ and $R_1$ independently of the other, if present, are independently selected from (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$ and $R_6$ can each be joined to a phenyl ring in the central structure,

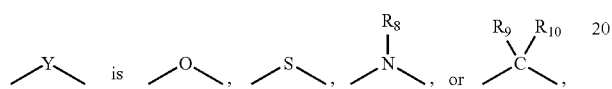

wherein $R_8$, $R_9$, and $R_{10}$ each, independently of the other, is optionally present and wherein, if one or more are present, each of $R_8$, $R_9$, and $R_{10}$ is independently selected from (i) a hydrogen atom, (ii) an alkyl group, (iii) an aryl group, (iv) an arylalkyl group, or (v) an alkylaryl group; wherein in further embodiments, the number of carbon atoms in $R_1+R_2+R_3+R_4+R_5+R+R_8+R_9+R_{10}$ is at least about 4, or in another embodiment at least about 16; wherein R" is optionally present and wherein R' and R", if present, are each independently selected from (i) an alkyl group, (ii) an aryl group, (iii) an arylalkyl group, or (iv) an alkylaryl group, wherein R' and R" are independently selected from linear or branched, saturated or unsaturated, or cyclic components, wherein in embodiments at least one of R' or R" contains at least about 5 carbon atoms, or at least about 6 carbon atoms, wherein in further embodiments, R' or R", if present, are independently selected from an alkyl group containing from about 0 carbon atoms (that is, R" is 0) to about 8 carbon atoms, from about 1 carbon atom to about 8 carbon atoms, or about 12 carbon atoms, or about 18 carbon atoms, or about 30 carbon atoms, or about 50 carbon atoms, or about 100 carbon atoms, wherein in embodiments, R' or R", if present, are independently selected from an aryl group containing about 5 carbon atoms, or about 6 carbon atoms, or about 10 carbon atoms, wherein in embodiments R' or R", if present, are independently an alkylaryl group or an arylalkyl group containing about 7 carbon atoms, or about 30 carbon atoms, or about 50 carbon atoms, or about 100 carbon atoms; for example, in one embodiment, R' contains about 18 carbon atoms and R" is 0 carbon atoms (that is R" is not present); wherein A is an anion, and wherein CA is either a hydrogen atom or a cation. In embodiments, R' or R", if present are attached, for example,

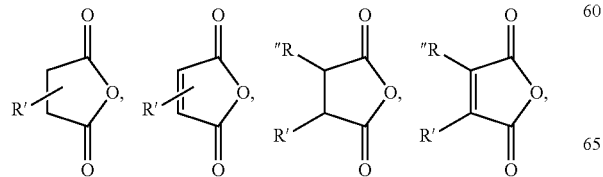

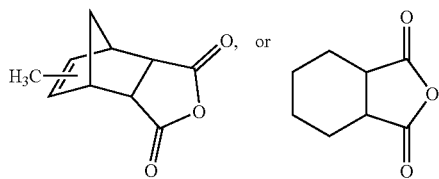

DETAILED DESCRIPTION

The present disclosure is directed to phase change inks containing colorant compounds of the formula

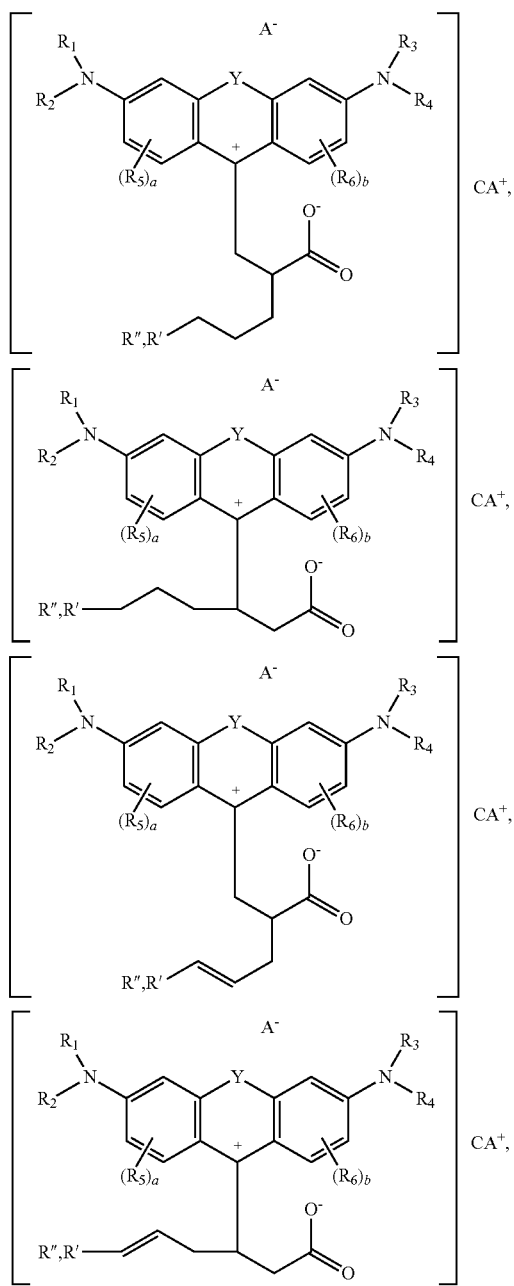

-continued

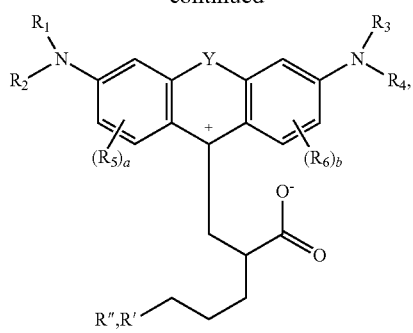

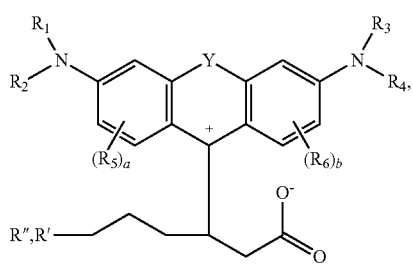

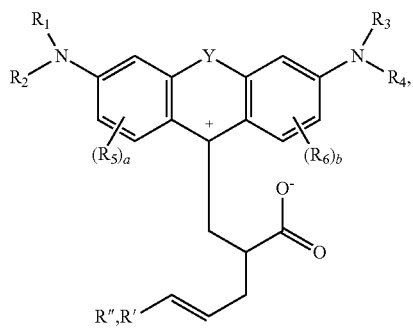

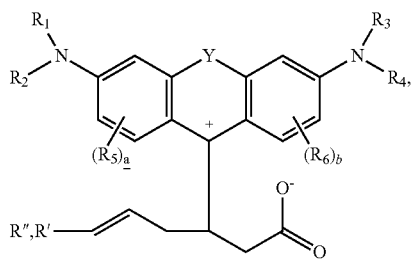

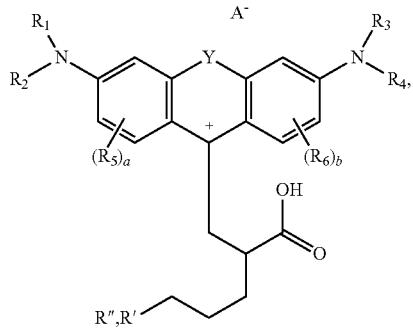

-continued

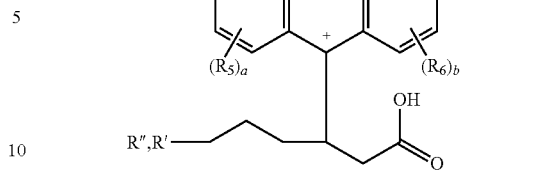

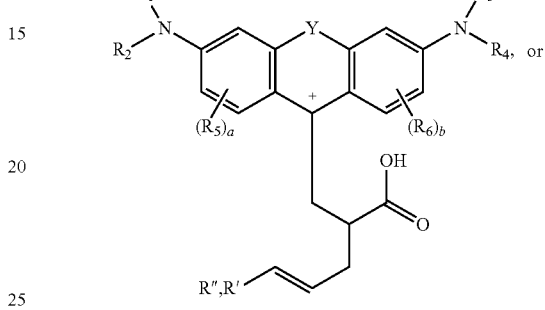

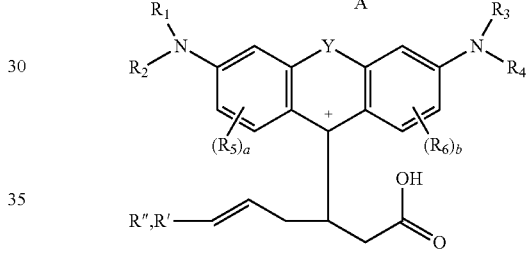

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3, wherein in embodiments, a and b are each zero; wherein $R_5$ and $R_6$ are each optionally present and wherein each of $R_5$ and $R_6$ independently of the other, if present, are independently selected from (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$ and $R_6$ can each be joined to a phenyl ring in the central structure,

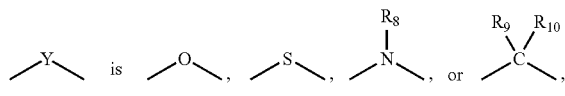 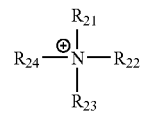

wherein $R_8$, $R_9$, and $R_{10}$ each, independently of the other, is optionally present and wherein, if one or more are present, each of $R_8$, $R_9$, and $R_{10}$ is independently selected from (i) a hydrogen atom, (ii) an alkyl group, (iii) an aryl group, (iv) an arylalkyl group, or (v) an alkylaryl group; wherein in further embodiments, the number of carbon atoms in $R_1+R_2+R_3+R_4+R_5+R_6+R_8+R_9+R_{10}$ is at least about 4, or in another embodiment at least about 16; wherein R'' is optionally present and wherein R' and R'', if present, are each independently selected from (i) an alkyl group, (ii) an aryl group, (iii) an arylalkyl group, or (iv) an alkylaryl group, wherein R' or R'' are independently selected from linear or branched, saturated or unsaturated, substituted or unsubstituted, or cyclic components, wherein in embodiments at least one of R' or R'' is a waxy unit having at least about 5 carbon atoms, or at least about 6 carbon atoms, or at least about 10 carbon atoms, wherein in embodiments, R' or R'', if present, are independently selected from an alkyl group containing from about 0 carbon atoms (that is, R'' is 0) to about 8 carbon atoms, from about 1 carbon atom to about 8 carbon atoms, or about 18 carbon atoms to about 100 carbons atoms, or about 12 carbon atoms, or about 18 carbon atoms, or about 30 carbon atoms, or about 50 carbon atoms, or about 100 carbon atoms, wherein in embodiments, R' or R'', if present, are independently selected from an aryl group containing about 5 carbon atoms, or about 6 carbon atoms, or about 10 carbon atoms, wherein in embodiments R' or R'', if present, are independently an alkylaryl group or an arylalkyl group containing about 7 carbon atoms, or about 30 carbon atoms, or about 50 carbon atoms, or about 100 carbon atoms. In one embodiment, R' contains about 18 carbon atoms and R'' is 0 carbon atoms. In embodiments, R' or R'' are attached as follows, for example,

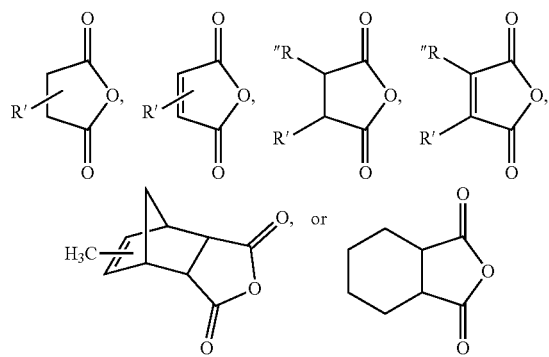

wherein A is an anion; and wherein CA is either a hydrogen atom or a cation. In embodiments, A is an anion, with examples of suitable anions including (but not being limited to) $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof. In embodiments, CA is either a hydrogen atom or a cation with examples of suitable cations including (but not being limited to) alkali metal cations, such as Li+, Na+, K+, Rb+, and Cs+, nonpolymeric or monomeric ammonium and quaternary amine cations, including those of the general formula wherein each of $R_{21}$, $R_{22}$, $R_{23}$, and $R_{24}$, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in some embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of $R_{21}$, $R_{22}$, $R_{23}$, and $R_{24}$ can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In one embodiment, the number of carbon atoms in $R_1+R_2+R_3+R_4$ is at least about 4, in another embodiment at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In some specific embodiments wherein

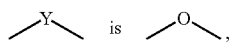

in one embodiment, the number of carbon atoms in $R_1+R_2+R_3+R_4$ is at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In some specific embodiments wherein

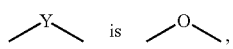

at least one of $R_1$, $R_2$, $R_3$, and $R_4$ is a group of the formula

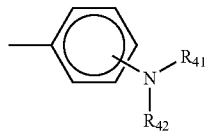

wherein $R_{41}$ and $R_{42}$ each, independently of the other, is (i) an alkyl group (including linear, branched, saturated, unsaturated, cyclic, substituted, and unsubstituted alkyl groups, and wherein hereto atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of R41 and R42 can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In some specific embodiments wherein

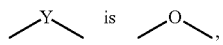

at least one of $R_1$, $R_2$, $R_3$, and $R_4$ is a branched alkyl group having in one embodiment at least about 19 carbon atoms, and in another embodiment at least about 20 carbon atoms.

Since hetero atoms can be included in the alkyl, aryl, arylalkyl, and alkylaryl groups, and since the groups can be substituted, it is to be understood that $R_1$, $R_2$, $R_3$, $R_4$, $R_5$, $R_6$, $R_8$, $R_9$, and $R_{10}$ can also be groups such as alkoxy, polyalkyleneoxy, aryloxy, polyaryleneoxy, arylalkyloxy, polyarylalkyleneoxy, alkylaryloxy, or polyalkylaryleneoxy groups, provided that the oxygen atom in such a group is not directly bonded to a nitrogen, oxygen, or sulfur atom in the

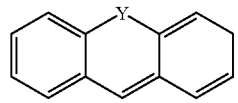

central structure.

Examples of situations wherein one of the R1-4 groups is a cycloalkyl is when

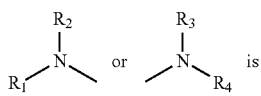

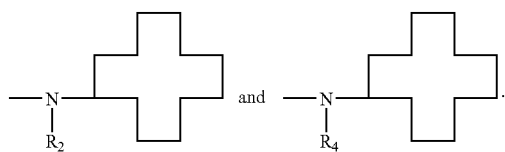

Examples of situations wherein the R1-4 groups are joined together to form a ring are when

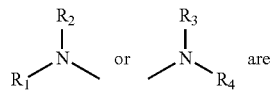

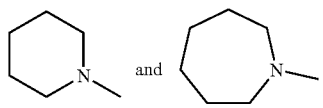

Examples of situations wherein one of the R1-4 groups is joined to a phenyl ring in the central structure is when

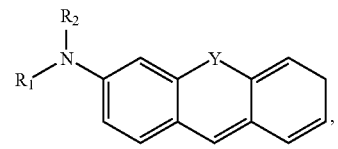

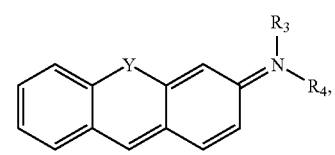

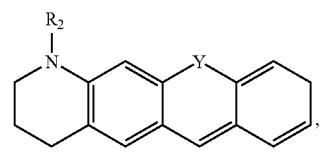

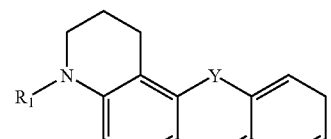

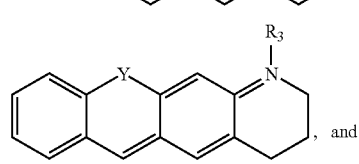

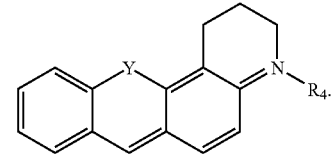

Colorant compounds suitable for inks according to the present disclosure include rhodamines, wherein

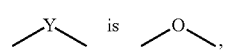

of the general formula

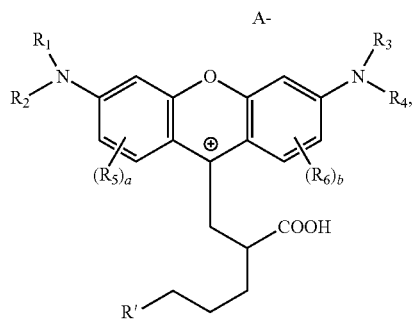

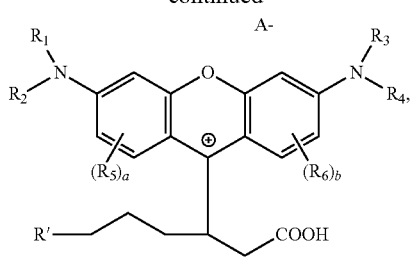
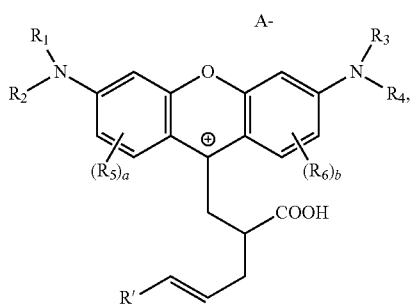
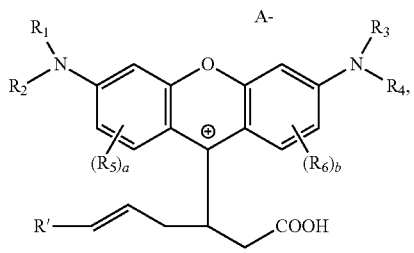
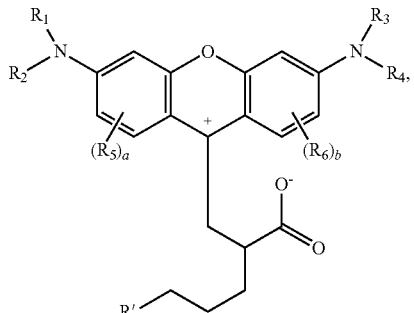
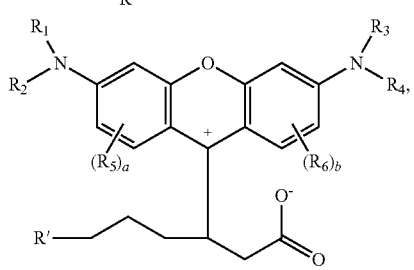
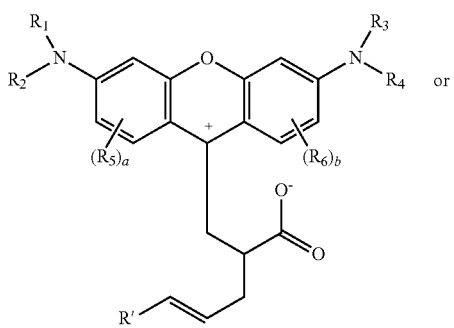
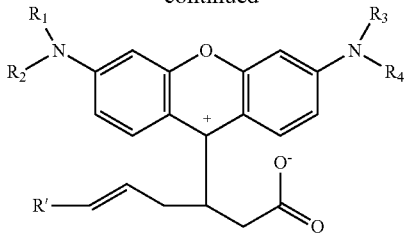
acridines, wherein
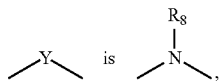
of the general formula
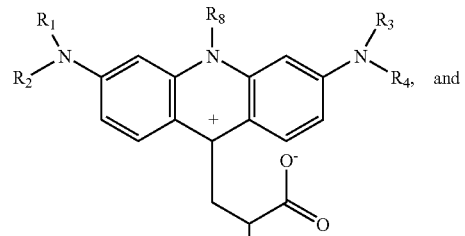
and
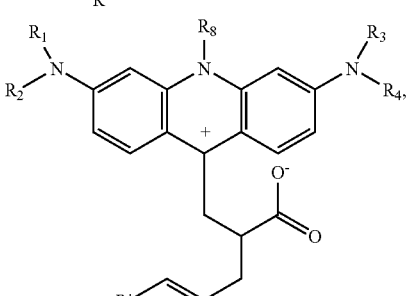
sulforhodamines, wherein
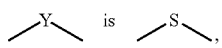 is 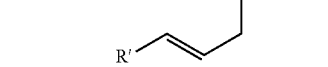,
of the general formula
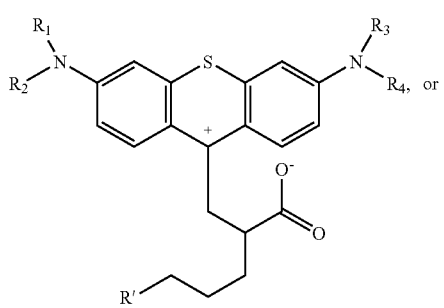
or -continued

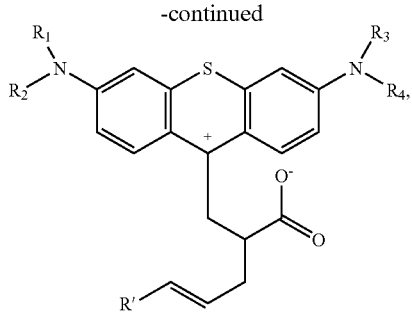

anthracenes, wherein

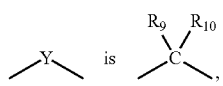 is of the general formula

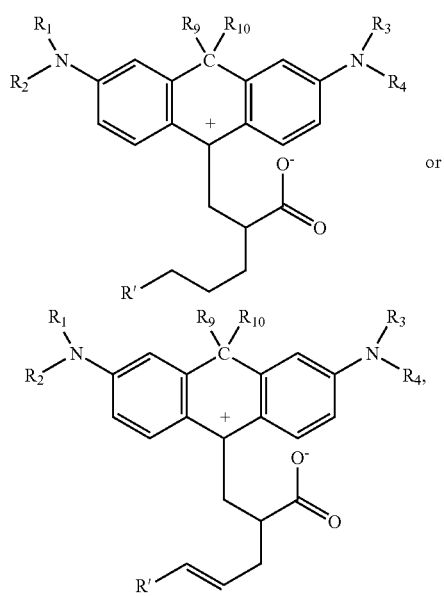

and the like. In a specific embodiment, the anion A can be an organic dianion of the formula A1-R11-A2 wherein A1 and A2 each, independently of the other, are anionic groups, such as carboxylate, sulfonate, or the like, and wherein R11 is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, and wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Examples of suitable organic dianions include unsubstituted and substituted naphthalene disulfonates, unsubstituted and substituted benzene disulfonates, and the like, as well as mixtures thereof.

In another specific embodiment, the anion A can be an organic trianion, tetraanion, and higher, an oligomeric and polymeric anion, such as a polysulfonate or polycarboxylate, or the like.

In one specific embodiment, the colorant compounds for inks according to the present disclosure are of the formula
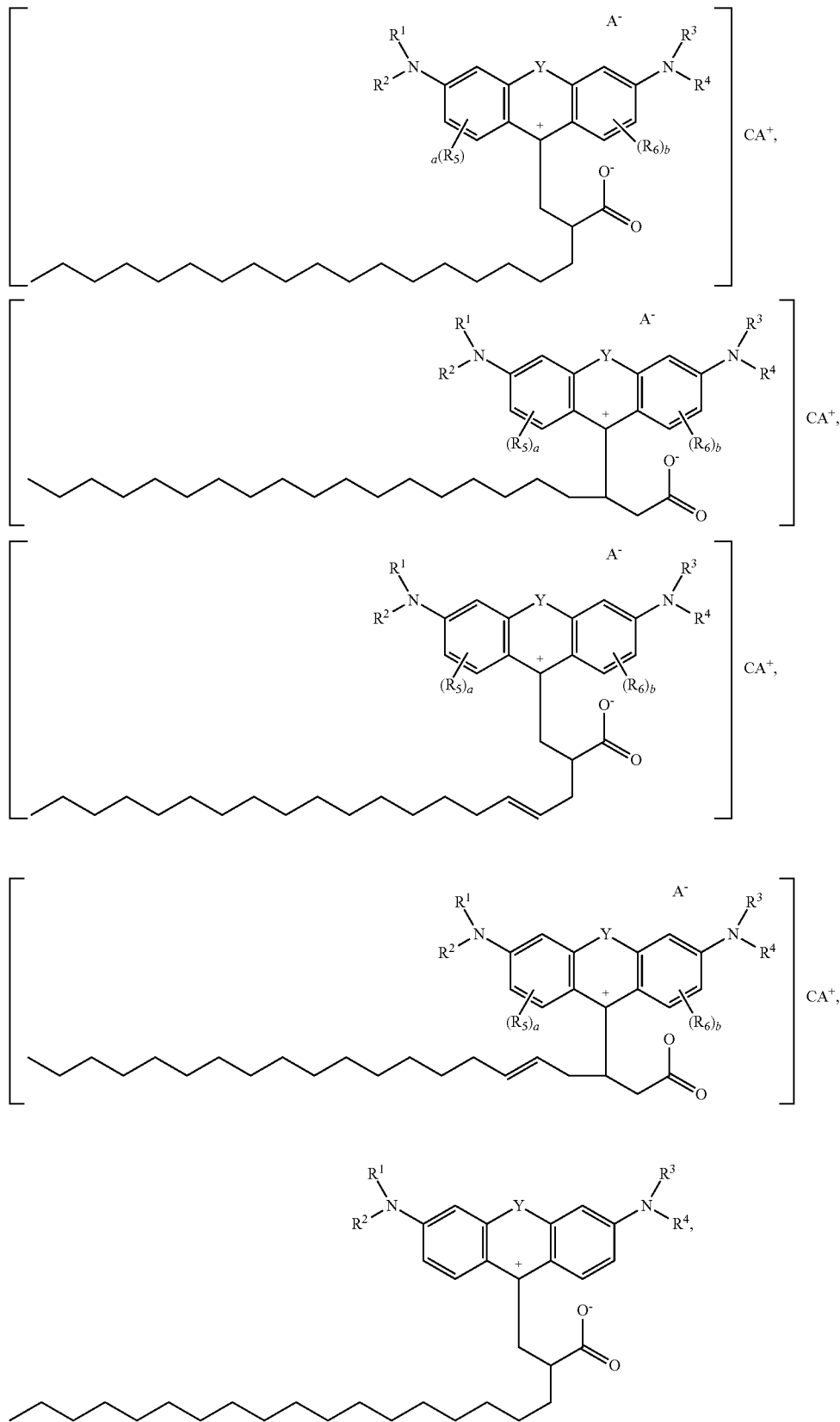

-continued
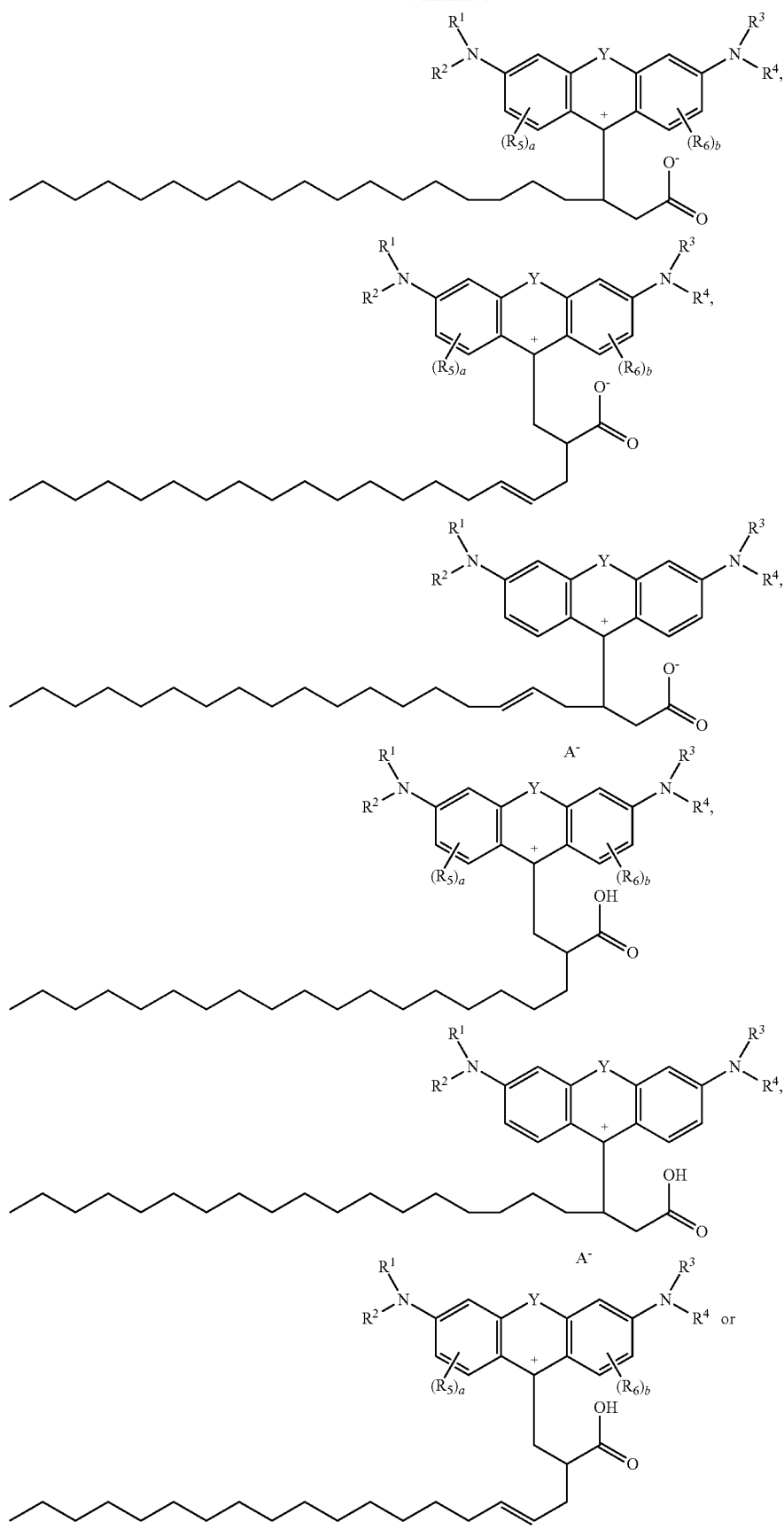

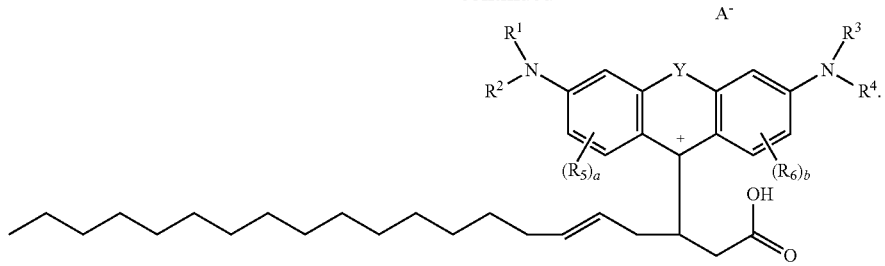
In one specific embodiment, the colorant compounds for inks according to the present disclosure are of the formula
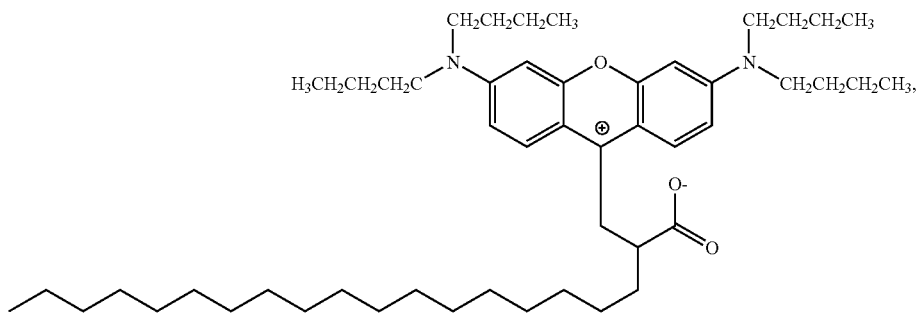
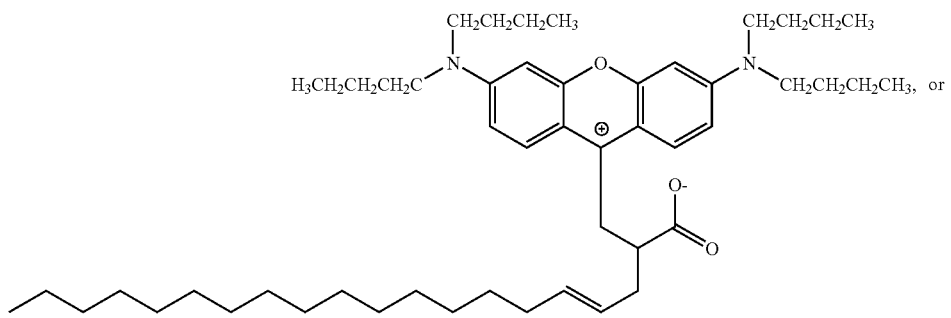
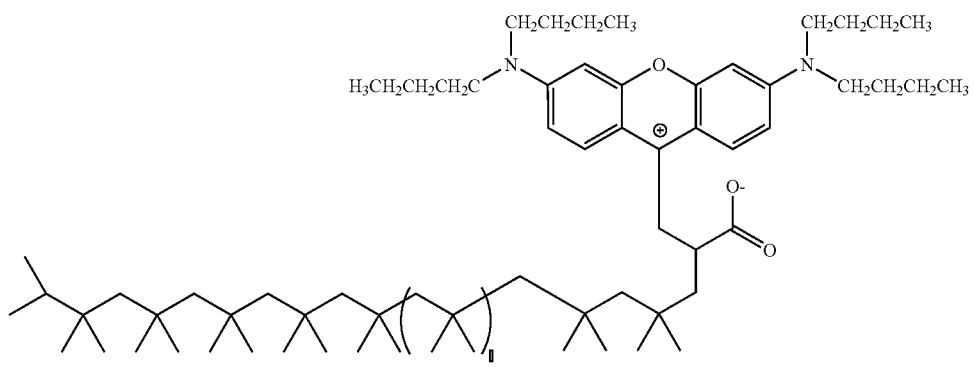

wherein ☐ is 7. It is to be understood that all possible tautomeric forms of these colorants are included within the above formulae.

Colorants compounds for inks of the present disclosure can be prepared by any desired or effective procedure. For example, a succinic anhydride copolymer of the formula

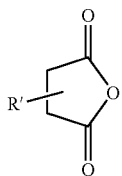

having the desired R' groups as defined herein can be admixed with one or more aminophenols (for example, N,N-diethylaminophenol, MW=165, available from Aldrich Chemical Corp.) of the formula

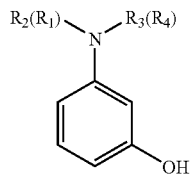

having the desired $R_1$, $R_2$, $R_3$, and $R_4$ groups, etc., thereon, with the $R_1$, $R_2$, $R_3$, and $R_4$ groups, etc, selected as defined for the colorant herein, heated, either neat or, optionally, in the presence of a solvent, after which an acid is added, for example conc. $H_2SO_4$ with additional heating.

The succinic anhydride copolymer and the aminophenol are present in any desired or effective relative amounts, in one embodiment at least about 0.5 mole of succinic anhydride copolymer per every 2 moles of aminophenol, in another embodiment at least about 0.9 mole of succinic anhydride copolymer per every 2 moles of aminophenol, and in yet another embodiment at least about 1 mole of succinic anhydride copolymer per every 2 moles of aminophenol, and in one embodiment no more than about 1.9 moles of succinic anhydride copolymer per every 2 moles of aminophenol, in another embodiment no more than about 1.5 moles of succinic anhydride copolymer per every 2 moles of aminophenol, and in yet another embodiment no more than about 1.1 moles of succinic anhydride copolymer per every 2 moles of aminophenol, although the relative amounts can be outside of these ranges.

If desired, the reaction can be run neat, in the absence of a solvent. In addition, if desired, the reaction can be run in the presence of an optional solvent. Examples of suitable solvents include tetramethylene sulfone (sulfolane), N-methylpyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of succinic anhydride copolymer, in another embodiment at least about 1 liter per every 0.3 mole of succinic anhydride copolymer, and in yet another embodiment at least about 1 liter per every 0.35 mole of succinic anhydride copolymer, and in one embodiment no more than about 1 liter per every 2 moles of succinic anhydride copolymer, in another embodiment no more than about 1 liter per every 1.5 moles of succinic anhydride copolymer, and in yet another embodiment no more than about 1 liter per every 1 mole of succinic anhydride copolymer, although the relative amounts can be outside of these ranges.

The mixture of succinic anhydride copolymer, aminophenol, and optional solvent is then heated to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges. The mixture of succinic anhydride copolymer, aminophenol, and optional solvent is heated for any effective period of time, in one embodiment at least about 5 minutes, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

An acid is then added and the mixture heated for any to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of succinic anhydride copolymer, aminophenol, optional solvent, and acid is heated for any effective period of time, in one embodiment at least about 5 minutes, in another embodiment at least about 1 hour, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

If desired, the resulting product can be purified by pouring the reaction mixture into an organic non-water-soluble and non-water-miscible solvent in which the product is soluble or miscible and in which undesirable salt by products are not soluble, such as methanol, methyl isobutyl ketone, toluene, hexane, heptane, or the like, followed by admixing the solvent containing the product with water in a separatory funnel and separating the aqueous and organic phases. The crude product can then, if desired, be further purified by washing it with aqueous EDTA to remove metal salts, followed by washing with water. If desired, a titration or other instrumental technique, such as AA (atomic absorption) or ICP (inductively coupled plasma) can be performed to determine if the metal salts have been completely removed. The purified product can be isolated by distilling off any solvents.

Various substituents can be placed on the rings of the colorants of the present disclosure by any desired or effective method, such as, for example, the methods disclosed in U.S. Pat. No. 5,847,162 and U.S. Pat. No. 1,991,482, the disclosures of each of which are totally incorporated herein by reference. See for example, U.S. patent application Ser. No. 10/607,382, published Jan. 20, 2005, and U.S. Pat. No. 6,860,931, the disclosures of each of which are hereby incorporated by reference herein in their entireties. Phase change inks of the present disclosure contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

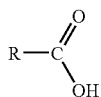

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/33943, and PCT Publication WO 95/04760, the disclosures of each of which are totally incorporated herein by reference. Mixtures of fatty imide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides, and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in some embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present disclosure in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks of the present disclosure contain a colorant compound of the formula

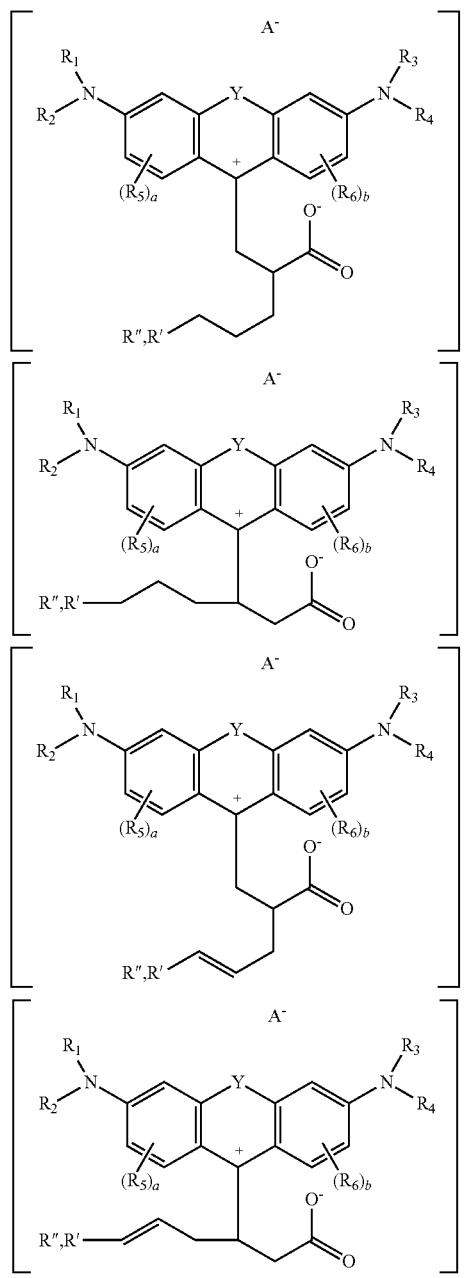

-continued

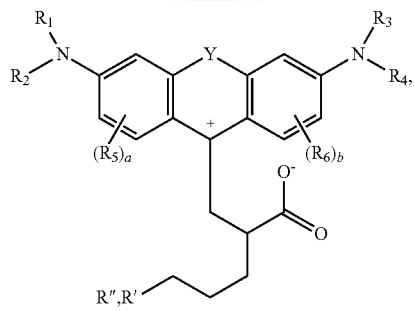

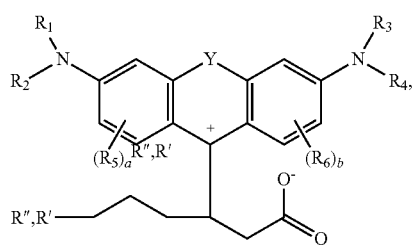

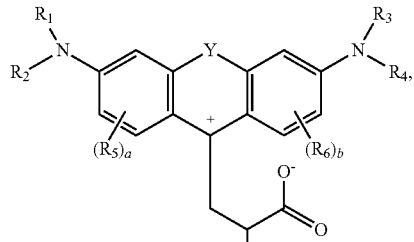

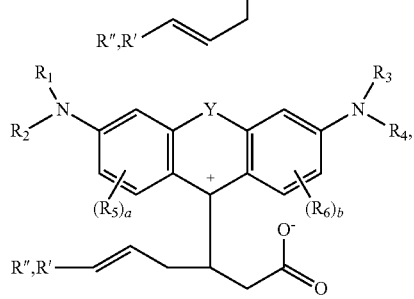

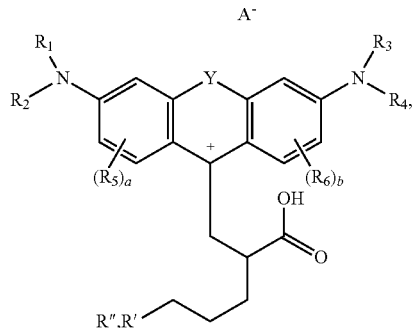

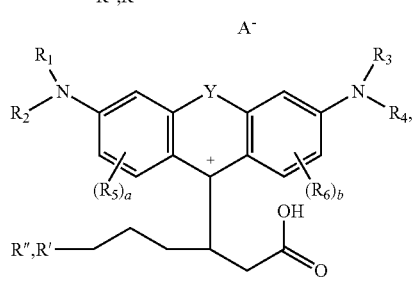

-continued

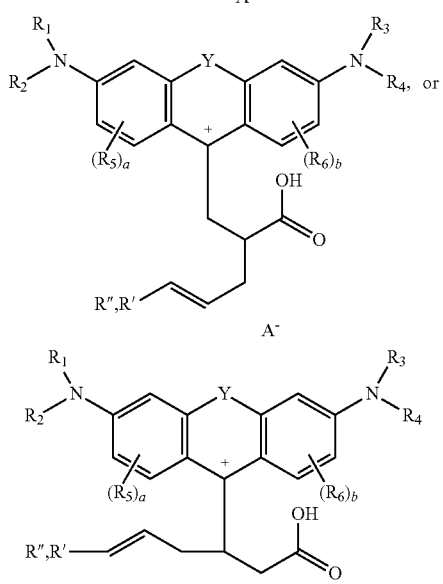

This colorant is present in the ink in any desired or effective amount to obtain the desired color or hue, in one embodiment, in an amount of at least about 0.1 percent by weight of the ink, in another embodiment of at least about 0.5 percent by weight of the ink, in yet another embodiment of at least about 1 percent by weight of the ink, in still another embodiment of at least about 2 percent by weight of the ink, and in another embodiment of at least about 3 percent by weight of the ink, and in one embodiment of no more than about 20 percent by weight of the ink, in another embodiment of no more than about 1.3 percent by weight of the ink, and in yet another embodiment of no more than about 6 percent by weight of the ink, although the amount can be outside of these ranges. The colorant according to the present disclosure can either be the sole colorant in the ink or can be present in combination with other colorants, such as dyes, pigments, mixtures thereof, and the like.

In specific embodiments, the inks of the present disclosure further contain an acid having a Ka value greater than that of the Ka of the carboxylic acid and/or sulfonic acid and/or carboxylate and/or sulfonate groups on the colorant. Specific examples of suitable acids include organic sulfonic acids, including alkyl benzene sulfonic acids such as para-toluenesulfonic acid, dodecylbenzenesulfonic acid, and the like, p-toluene sulfonic acid, hydrochloric acid, trifluoroacetic acid, methylsulfonic acid, trifluoromethyl sulfonic acid, hydrobromic acid, and the like, as well as mixtures thereof. The acid is present in any desired or effective amount, in one embodiment at least about 2 percent by weight of the amount of colorant according to the present disclosure, and in another embodiment at least about 5 percent by weight of the amount of colorant according to the present disclosure, and in one embodiment no more than about 100 percent by weight of the amount of the colorant according to the present disclosure, and in another embodiment no more than about 30 percent by weight of the colorant according to the present disclosure, although the amount of acid can be outside of these ranges.

The inks of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like.

When present, the optional antioxidant is present in the ink in any desired or effective amount in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present disclosure can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of it least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present disclosure in one embodiment have melting points of no lower than about 50° C. in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions of the present disclosure generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions of the present disclosure can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

The inks of the present disclosure can be employed in apparatus for direct printing ink jet processes and in indirect (offset) printing ink jet applications. Another embodiment of the present disclosure is directed to a process which comprises incorporating an ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Synthesis of Octadecyl Succinic Anhydride Based Rhodamine. To a 100 milliliter beaker equipped with a Teflon® coated magnet, condenser and oil bath was charged 9.4 grams of octadecyl succinic anhydride (352 MW) of the formula

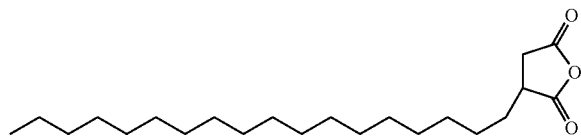

and 11.8 grams N,N-dibutylphenol (a 221 MW aminophenol obtained from TCI America) of the formula.

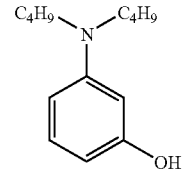

The beaker was placed in a 160° C. oil bath and stirring was initiated. After several minutes, the contents of the beaker began to turn red. After one hour at 160 C, about 1.14 grams concentrated sulfuric acid with 0.43 grams of water were added dropwise. After 20 minutes of additional heating, the contents were poured into a sodium hydroxide solution containing 0.8 grams NaOH and 88 grams water. An oily product precipitated out. About 100 milliliters of methylene chloride was added to the contents to extract the product from the water. The methylene chloride layer was then run through a silica gel plug. The dye adsorbed strongly to the gel and brown light red solvent went through the plug. Methanol was sued to chase the color off of the plug. The methanol was then evaporated yielding the magenta waxy solid. The Zwitterionic form of this colorant is believed to be of the formula

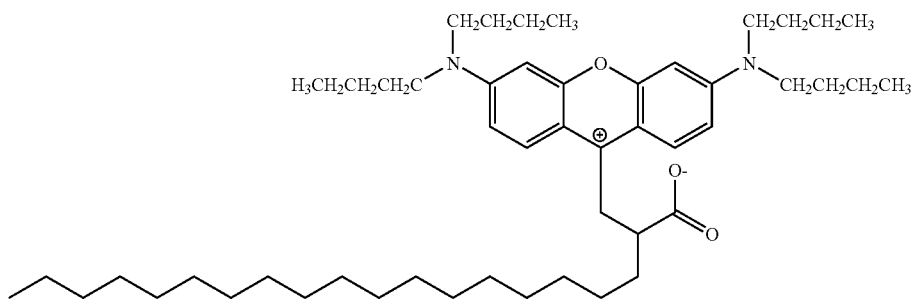

Other synthetic processes can also be used.

Example 2

To a 100 milliliter beaker equipped with a Teflon® coated magnet, condenser and oil bath was charged 19.9 grams octadecenyl succinic anhydride (352 MW available from Humphry Chemical Co.) of the formula

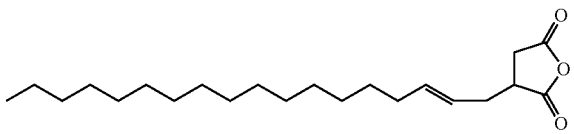

And 25 grams of N,N-dibutylphenol (221 MW, available from TCI America) of the formula

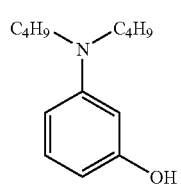

The beaker was placed in a 150° C. oil bath and stirring was initiated. After several minutes, the contents of the beaker began to turn red. After one hour at 150° C., a solution containing about 2.85 grams concentrated sulfuric acid with 1.1 grams of water were added drop-wise. After 20 minutes of additional heating; the contents were poured into a sodium hydroxide solution containing 2.2 grams of NaOH and 220 grams of water. An oily product precipitated out. About 100 milliliters of toluene was added to the contents to extract the product from water. The toluene layer was placed in a separatory funnel and washed with water and then run through a silica gel plug. The dye adsorbed strongly to the gel and brown light red solvent went through the plug. Methanol was used to chase the color off the plug. The solvent was then evaporated yielding the magenta waxy solid. The Zwitterionic form of this colorant is believed to be of the formula

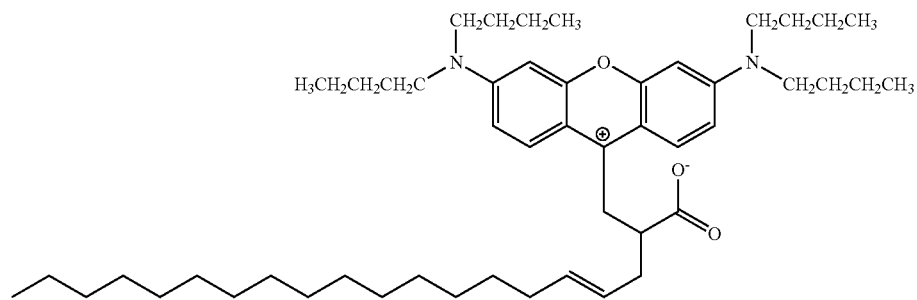

Example 3

Synthesis of Octadecenyl Succinic Anhydride Based Rhodamine. To 200 milliliter beaker equipped with a Teflon® coated magnet, condenser and oil bath was charged 100 grams of polyisobutylene based succinic anhydride (OLOA 15500 cut with mineral oil to 50%, 1000 MW, available from Chevron Oronite Co. LLC) of the formula wherein ☐ is 7.

wherein ☐ is 7. The beaker was placed in a 130° C. oil bath and stirring was initiated Once the OLOA 15500 was at a suitable temperature, about 130° C., stirring was initiated with the stir magnet. After several minutes, about 22 grams of N,N-dibutylphenol (221 MW, available from TCI America) of the formula

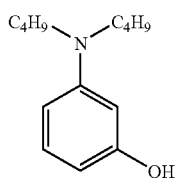

was added to the beaker and the temperature of the oil bath was raised to 150° C. After about 15 minutes, the contents of the beaker began to turn red and eventually a very deep magenta. The contents were heated and stirred at 150° C. for about 2.5 hours. After about 2.5 hours, 4.6 grams of $H_2SO_4$ was added (vigorous bubbling was observed) and the contents stirred for an additional 15 minutes and finally quenched into a 1 liter breaker containing 700 milliliters of methanol. The methanol was decanted off leaving the product which was a viscous magenta oil. The Zwitterionic form of this colorant is believed to be of the formula

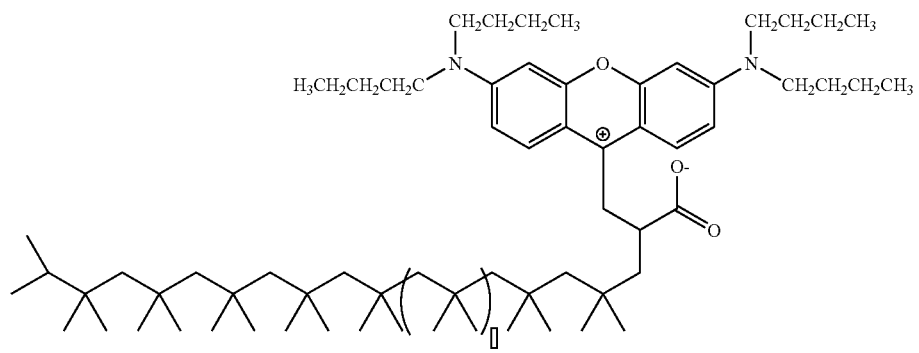

wherein ☐ is 7.

Example 4

Preparation of an Ink Base. An ink base was prepared by melting, admixing, and filtering the following ingredients: 43.59 parts by weight polyethylene wax (PE 655®, obtained from Baker Petrolite) of the formula $CH_3(CH_2)_{50}CH_3$); 19.08 parts by weight stearyl stearamide wax (KEMAMIDE® S-180, obtained from Crompton Corporation); 18.94 parts by weight tetra-amide resin obtained from the reaction of one equivalent of a C-36 dimer acid (obtained from Uniqema, New Castle, Del.) with two equivalents of ethylene diamine and UNICID® 700 (obtained from Baker Petrolite), a long chain hydrocarbon having a terminal carboxylic acid group, prepared as described in Example 1 of U.S. Pat. No. 6,174,937, which is hereby incorporated by reference herein in its entirety; 11.71 parts by weight urethane resin obtained from the reaction of two equivalents of ABITOL® E hydroabietyl alcohol (obtained from Hercules Inc.) and one equivalent of isophorone diisocyanate, prepared as described in Example 1 of U.S. Pat. No. 5,782,966, which is hereby incorporated by reference herein; 6.48 parts by weight urethane resin that is the adduct of three equivalents of stearyl isocyanate and a glycerol-based alcohol, prepared as described in Example 4 of U.S. Pat. No. 6,309,453, which is hereby incorporated by reference herein in its entirety; 0.20 parts by weight NAUGUARD® 445 antioxidant (obtained from Uniroyal Chemical Co.). Thereafter, 600 grams of the ink carrier components as listed above in the percentages as listed above were added to 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER-AID obtained from Fluka Chemika, and proceeded at a temperature of 135 C until complete after 6 hours. The ink base was poured into molds containing about 31 grams of the colorless ink base and allowed to cool.

Example 5

Preparation of Ink Containing Colorant. About 30.0 grams of ink base from Example 4 was placed in a 100 milliliter beaker with a magnetic stir bar and subsequently placed in a 135 C oil bath until molten. About 2.0 grams of the product of Example 1 was then added and stirred for about 3 hours. The magenta colorant was then poured into an aluminum mold. This process was repeated in the same amounts for the products of Examples 2 and 3.

Example 6

Printing of Ink Samples Containing Colorant

Printed samples of the inks prepared in Example 5 were generated on HAMMERMLL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements. The printed samples were evaluated visually.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising a phase change ink carrier and a colorant compound of the formula

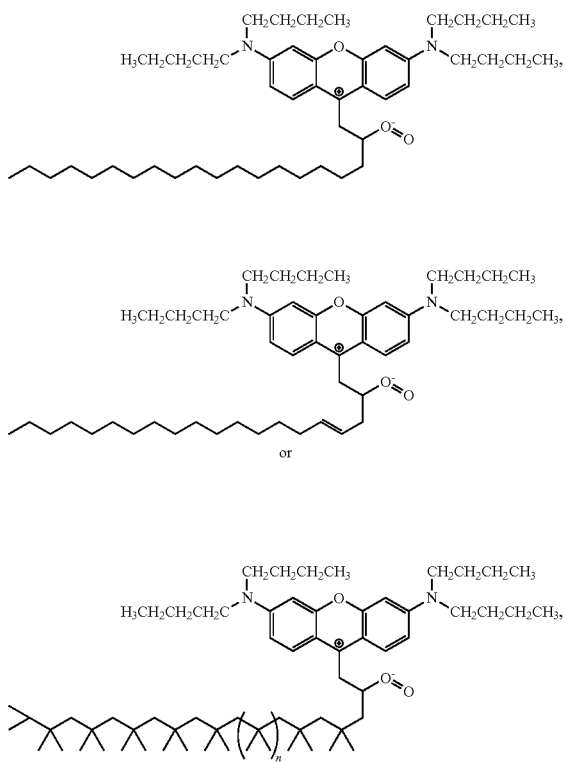

wherein n is 7.

2. A phase change ink composition according to claim 1, wherein the phase change ink carrier comprises a monoamide, a tetra-amide, or a mixture thereof.

3. A phase change ink composition according to claim 1, wherein the phase change ink carrier comprises (a) stearyl stearamide, (b) a dimer acid based tetra-amide that is the reaction product of dimer acid, ethylene diamine, and stearic acid, or (c) mixtures thereof.

4. A phase change ink composition according to claim 1, wherein the phase change ink carrier comprises an isocyanate-derived material, a urethane isocyanate-derived material, a urea isocyanate-derived material, a urethane/urea isocyanate-derived material, or mixtures thereof.

5. A phase change ink composition according to claim 1, wherein the phase change ink carrier comprises a mixture of one or more amides and one or more isocyanate-derived materials.

6. A phase change ink composition according to claim 1, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

7. A phase change ink composition according to claim 1, wherein the phase change ink carrier is present in the ink in an amount of at least about 0.1 percent by weight of the ink and wherein the phase change ink carrier is present in the ink in an amount of no more than about 99 percent by weight of the ink.

8. A phase change ink composition according to claim 1, wherein the ink further contains an antioxidant.

9. A phase change ink composition according to claim 8, wherein the antioxidant is present in the ink in an amount of at least about 0.01 percent by weight of the ink, and wherein the antioxidant is present in the ink in an amount of no more than about 20 percent by weight of the ink.

10. A phase change ink composition according to claim 1, wherein the ink further contains a viscosity modifier.

11. A phase change ink composition according to claim 10, wherein the viscosity modifier is present in the ink in an amount of at least about 0.1 percent by weight of the ink and wherein the viscosity modifier is present in the ink in an amount of no more than about 99 percent by weight of the ink.

12. A phase change ink composition according to claim 1, wherein the colorant is present in the ink in an amount of at least about 0.1 percent by weight of the ink.

13. A phase change ink composition according to claim 1, wherein the colorant is present in the ink in an amount of no more than about 20 percent by weight of the ink.

14. A phase change ink composition according to claim 1, wherein the ink has a melting point of no lower than about 50° C. and wherein the ink has a melting point of no higher than about 160° C.

15. A phase change ink composition according to claim 1, wherein the ink has a melt viscosity at a temperature of about 140° C. of no more than about 30 centipoise.

16. A phase change ink composition according to claim 1, wherein the ink has a melt viscosity at a temperature of about 140° C. of no less than about 1 centipoise.

17. A phase change ink composition according to claim 1, wherein the colorant is of the formula

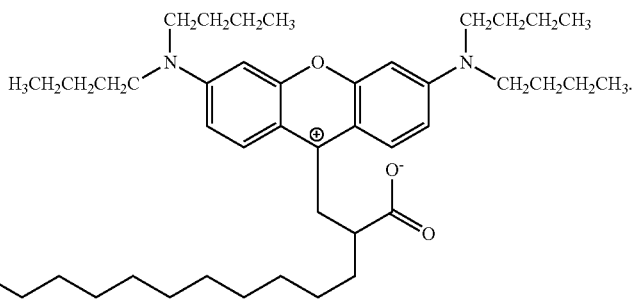

18. A phase change ink composition according to claim 1, wherein the colorant is of the formula

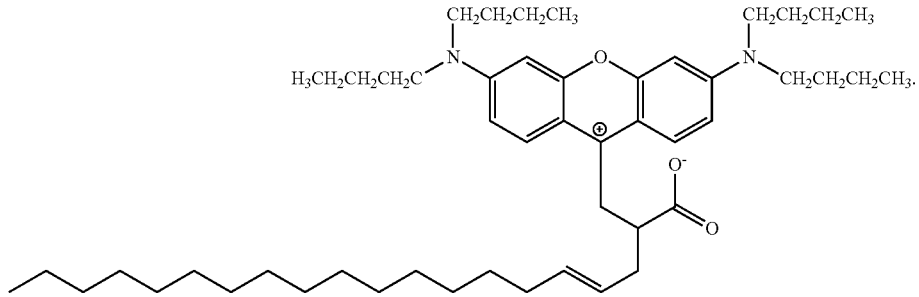

19. A phase change ink composition according to claim 1, wherein the colorant is of the formula

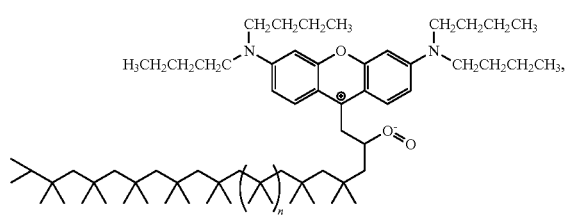

wherein n is 7.

20. A process which comprises (1) incorporating into an ink jet printing apparatus the phase change ink composition of claim 1; (2) melting the ink; and (3) causing droplets of the melted ink to be ejected in an imagewise pattern onto a substrate.

21. A process according to claim 20, wherein the printing apparatus employs a piezoelectric printing process wherein droplets of the ink are caused to be ejected in imagewise pattern by oscillations of piezoelectric vibrating elements.

22. A process according to claim 20, wherein the substrate is a final recording sheet and droplets of the melted ink are ejected in an imagewise pattern directly onto the final recording sheet.

23. A process according to claim 20, wherein the substrate is an intermediate transfer member and droplets of the melted ink are ejected in an imagewise pattern onto the intermediate transfer member followed by transfer of the imagewise pattern from the intermediate transfer member to a final recording sheet.

24. A process according to claim 23, wherein the intermediate transfer member is heated to a temperature above that of the final recording sheet and below that of the melted ink in the printing apparatus.

* * * * *